(12) United States Patent
Booher

(10) Patent No.: US 10,730,209 B1
(45) Date of Patent: Aug. 4, 2020

(54) COMPOSITE FRICTION ELEMENTS AND PULTRUSION METHOD OF MAKING SAME

(71) Applicant: Benjamin V. Booher, Scottsdale, AZ (US)

(72) Inventor: Benjamin V. Booher, Scottsdale, AZ (US)

( * ) Notice: Subject to any disclaimer, the term of this patent is extended or adjusted under 35 U.S.C. 154(b) by 16 days.

(21) Appl. No.: 15/961,786

(22) Filed: Apr. 24, 2018

Related U.S. Application Data

(60) Division of application No. 14/644,028, filed on Mar. 10, 2015, now Pat. No. 9,950,452, which is a continuation-in-part of application No. 13/796,212, filed on Mar. 12, 2013, now Pat. No. 8,974,621, which is a division of application No. 12/841,657, filed on Jul. 22, 2010, now Pat. No. 8,394,226, which is a continuation-in-part of application No.
(Continued)

(51) Int. Cl.
*B29C 41/00* (2006.01)
*B05C 5/00* (2006.01)
*B05C 15/00* (2006.01)
*B05C 9/00* (2006.01)
*B29C 41/22* (2006.01)
*B05C 5/02* (2006.01)
*B05C 9/12* (2006.01)
*B29L 31/16* (2006.01)

(52) U.S. Cl.
CPC ............. *B29C 41/22* (2013.01); *B05C 5/025* (2013.01); *B05C 5/027* (2013.01); *B05C 5/0233* (2013.01); *B05C 5/0245* (2013.01); *B05C 5/0275* (2013.01); *B05C 9/12* (2013.01); *B05C 15/00* (2013.01); *B29L 2031/16* (2013.01)

(58) Field of Classification Search
CPC ......... Y10T 156/1317; Y10T 156/1374; Y10T 156/1712; Y10T 156/1084; Y10T 156/1085; B32B 38/0004; B32B 38/0036; B32B 2038/042; B32B 2038/0076; B32B 38/08; B32B 38/10; B32B 5/08; B32B 15/14; B32B 17/03; B32B 37/10; B32B 37/00; B32B 37/06; B32B 37/16; B32B 37/0038; B05C 9/12; B05C 70/525; B05C 70/545; B05C 70/524; B05C 5/027; B05C 5/025; B05C 5/0245; B05C 5/0233; B05C 5/0275; B05C 5/00
See application file for complete search history.

(56) References Cited

U.S. PATENT DOCUMENTS 3,368,571 A 2/1968 Honorof
4,221,228 A 9/1980 Stoffel
(Continued)

*Primary Examiner* — Linda L Gray
(74) *Attorney, Agent, or Firm* — Booth Udall Fuller, PLC

(57) ABSTRACT

A composite friction unit of a three dimensional composite body is formed in a system for continuous process manufacturing of composite friction units. The system uses a plurality of rolls of reinforcing fiber fabrics, a resin dispensing system that receives a panel of reinforcing fiber fabric from each one of the rolls and separately dispenses resin through a plurality of dispensing tubes, each associated with a different panel, onto a surface of each panel. A forming die is positioned to receive the plurality of panels of reinforcing fiber fabric after resin is dispensed onto the panels and is configured to form a composite panel from the plurality of panels of reinforcing fiber fabrics. A cutting mechanism cuts a desired shape part from the composite panel.

13 Claims, 13 Drawing Sheets

Related U.S. Application Data

10/164,191, filed on Jun. 5, 2002, now abandoned, which is a division of application No. 09/651,802, filed on Aug. 30, 2000, now Pat. No. 6,479,413.

(56) References Cited

U.S. PATENT DOCUMENTS

| | | |
|---|---|---|
| 4,842,667 A | 6/1989 | Thorsted |
| 5,156,787 A | 10/1992 | Booher |
| 5,690,770 A | 11/1997 | Booher |
| 5,783,013 A * | 7/1998 | Beckman ............. B29C 70/523 |
| | | 156/180 |
| RE36,705 E | 5/2000 | Booher |
| 6,214,115 B1 | 4/2001 | Taylor |
| 6,479,413 B1 | 11/2002 | Booher |
| 7,055,455 B2 | 6/2006 | Burke |
| 7,328,735 B2 | 2/2008 | O |
| 8,394,226 B1 | 3/2013 | Booher |
| 2002/0197448 A1 | 12/2002 | Booher |
| 2013/0142953 A1 | 6/2013 | Maier |
| 2014/0223759 A1 | 8/2014 | Gougoulas |
| 2014/0342089 A1 | 11/2014 | Koster |

* cited by examiner

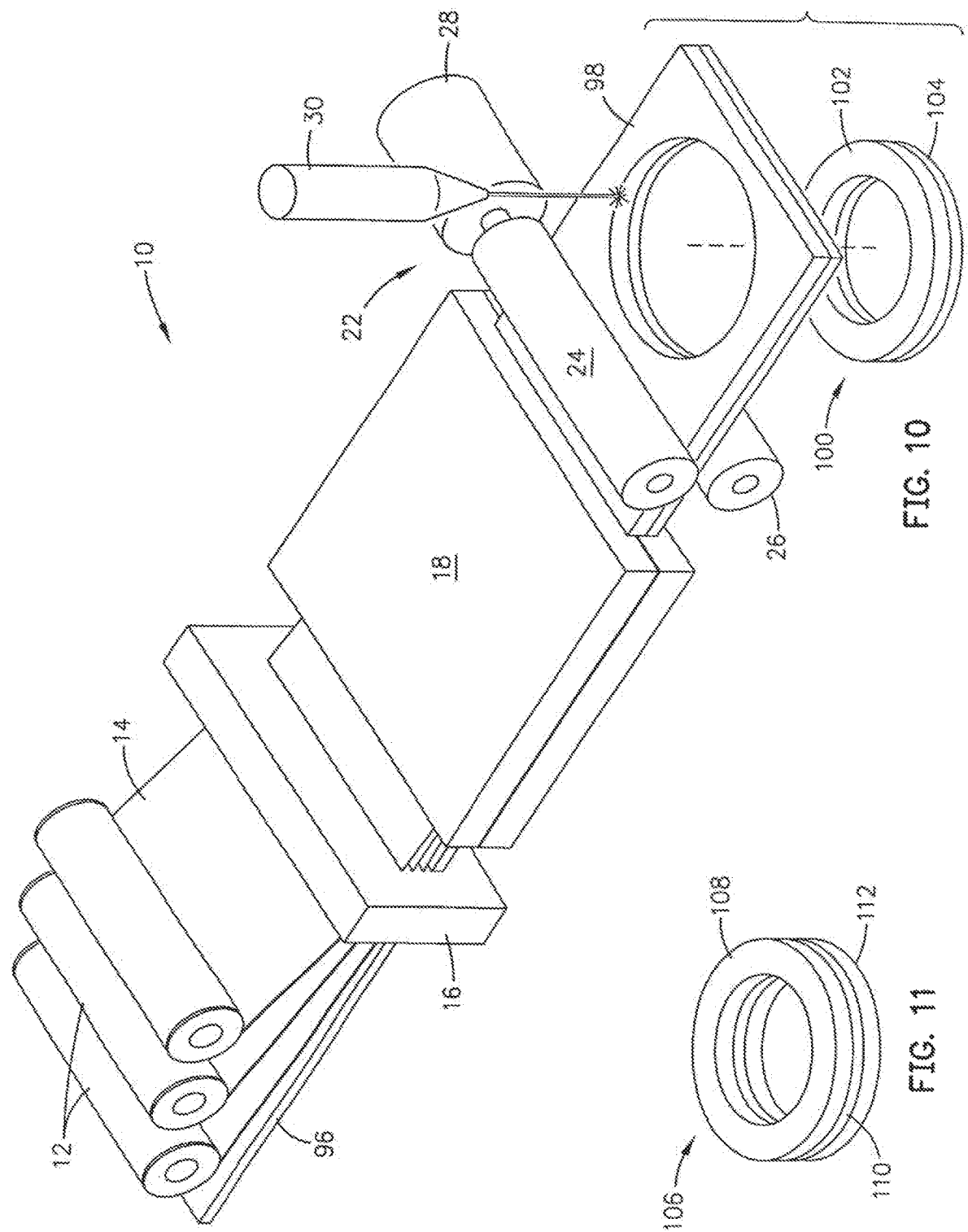

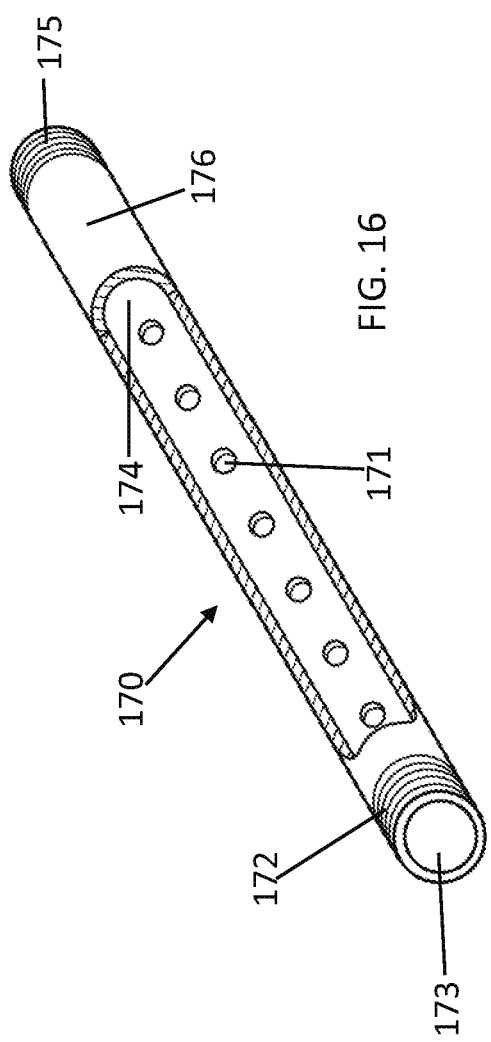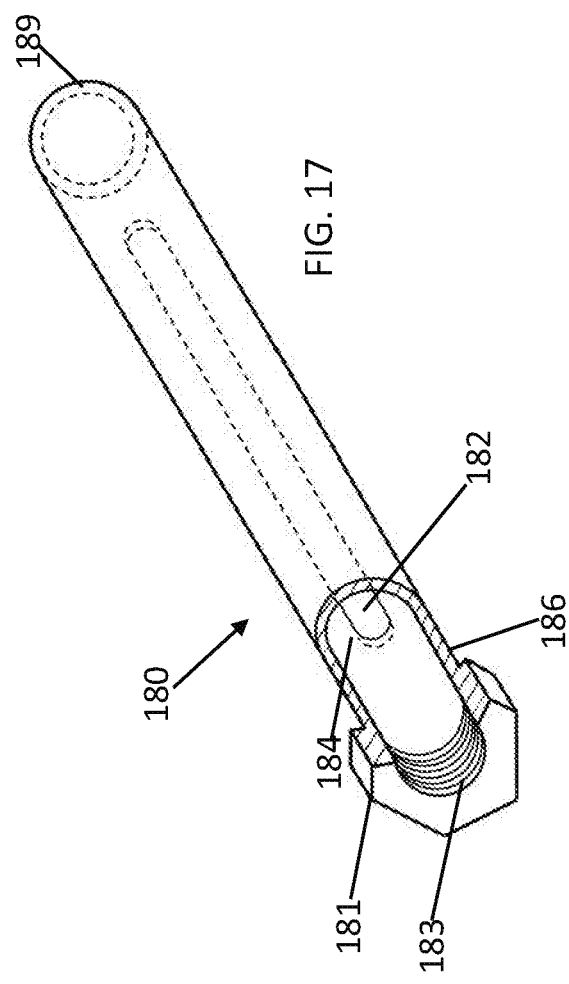

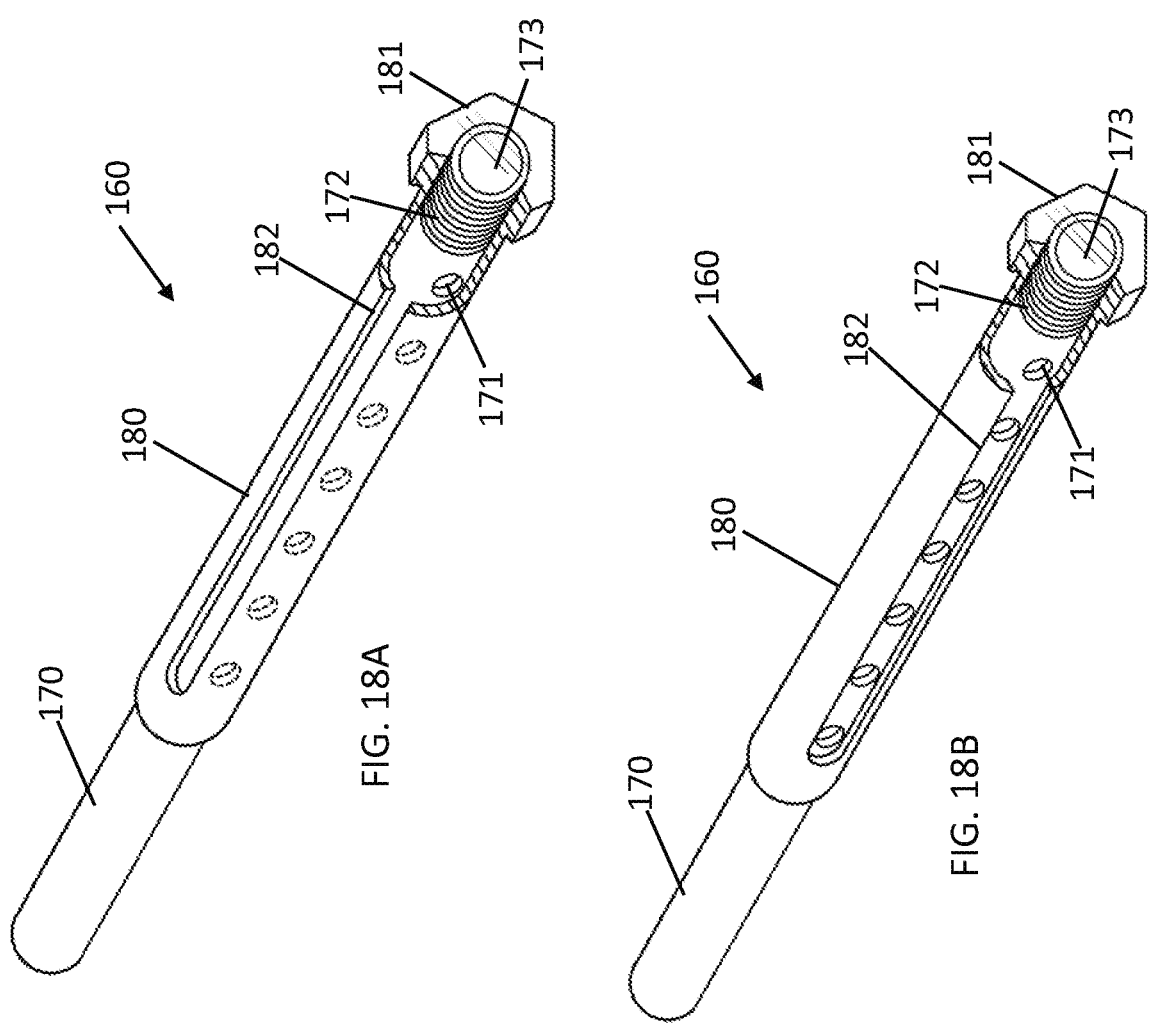

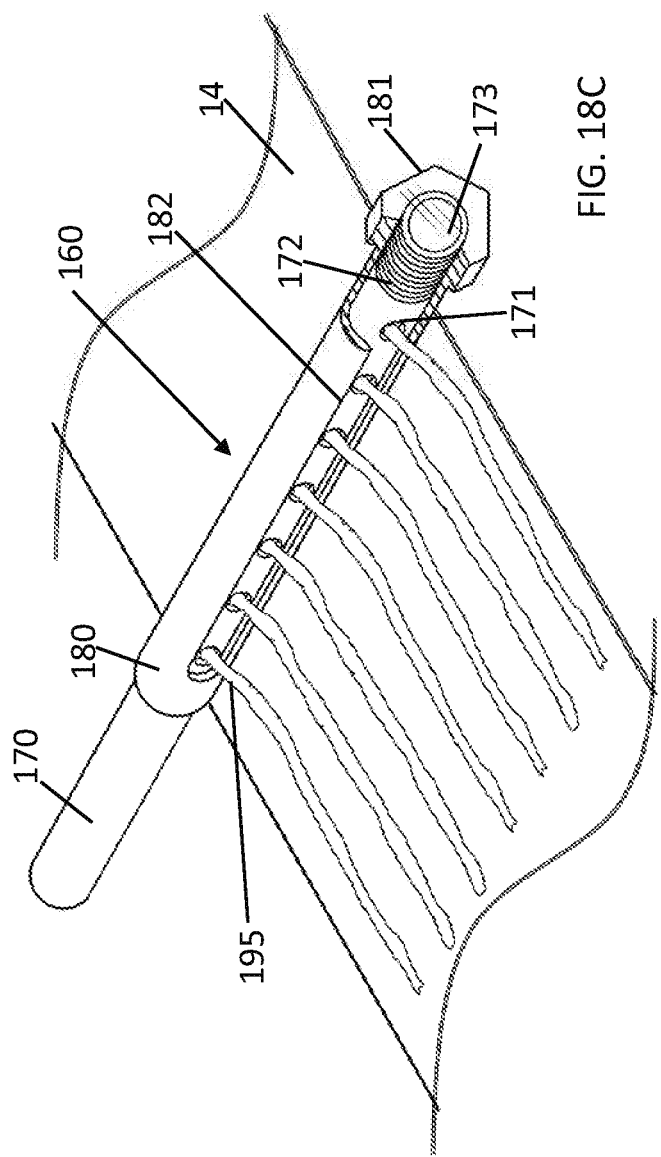
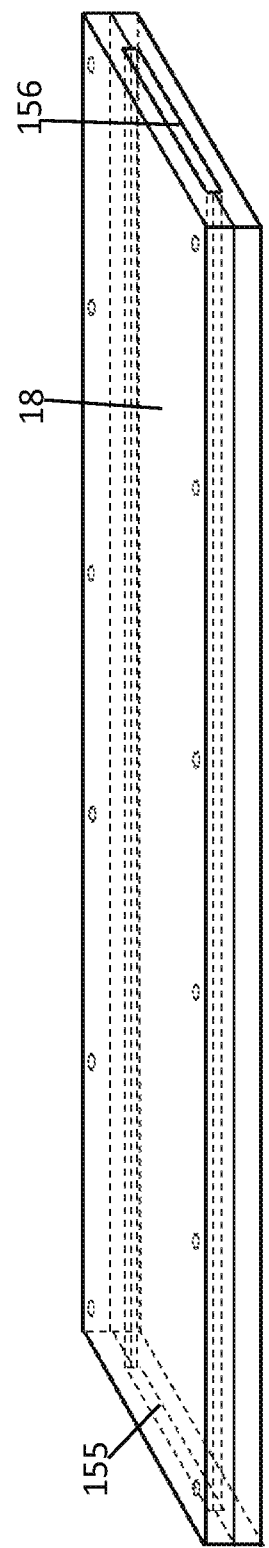

COMPOSITE FRICTION ELEMENTS AND PULTRUSION METHOD OF MAKING SAME

CROSS REFERENCE TO RELATED APPLICATIONS

This Application a division of earlier U.S. patent application Ser. No. 14/644,028, filed Mar. 10, 2015, now pending, which is a continuation-in-part of earlier U.S. patent application Ser. No. 13/796,212, filed Mar. 12, 2013, now issued as U.S. Pat. No. 8,974,621 on Mar. 10, 2015, which is a division of earlier U.S. patent application Ser. No. 12/841,657, filed Jul. 22, 2010, now issued as U.S. Pat. No. 8,394,226 on Mar. 12, 2013, which is a continuation-in-part of earlier U.S. patent application Ser. No. 10/164,191 filed Jun. 5, 2002, now abandoned, which application is a division of earlier U.S. application Ser. No. 09/651,802, filed Aug. 30, 2000, now issued as U.S. Pat. No. 6,479,413 on Nov. 12, 2002, the disclosures of which are hereby incorporated herein by reference.

BACKGROUND OF THE INVENTION

The present invention relates to composite friction elements for brakes and clutches and pertains particularly to improved friction elements, composition and method for making same.

A friction brake is basically a pair of friction members, one rotating and one stationary, brought into engagement to produce a friction force measured as brake torque for either slowing or stopping the rotating element. Brakes are preferably designed so that the brake torque is somewhat proportional to the input force used to engage the elements and the energy of the rotating member is dissipated in the form of heat. Unfortunately, pressure is not the only factor that influences the frictional response of the brake elements. Friction effects between friction elements cause friction force and brake torque to vary with engaging pressure, speed, and temperature, and to depend upon deposited interfacial film for stability. Nevertheless, brakes are preferably designed so that the brake torque is reasonably proportional to the input force used to engage the elements. The energy of braking is dissipated in the form of heat through the brake elements. For this reason they must be able to withstand a great deal of heat for most applications.

The rotating element of a brake system is usually a disc or drum made of metal such as a steel, and the stationary element is usually a composition pad or shoe lining moveable into and out of engagement with the rotating element. The composition element is designed to wear without undue wear of the metal disc or drum. The materials forming the composition element are the principal unpredictable variables that have the greatest affect on the performance characteristics of the brake system. Desirable materials for the composition element must be safe to use, relatively inexpensive, have good friction, wear and heat performance characteristics. This includes good fade resistance, or the ability to maintain good (preferably substantially uniform) braking with heat buildup.

A friction clutch is similar in some respects to a brake and is basically a pair of friction elements designed to selectively couple a rotating driving element to a driven element to bring the driven element up to speed to rotate with the driving element. The clutch elements, both rotating with one driving and one driven, are brought into engagement to produce a friction force driving torque for bringing either a slow moving or a stationary element up to speed with a rotating driving element. The clutch usually consists of a circular friction plate or disc having friction pads or elements of composition material on both faces squeezed between a pair of metal pressure plates.

Until recent years, the predominant reinforcing material used in the manufacture of friction pads and discs for brakes, clutches and the like was asbestos. These pads were manufactured by a molding process where each unit was formed of a composition of randomly oriented asbestos fibers in a bonding matrix placed under pressure in a mold cavity. However, it was discovered that asbestos is a carcinogenic substance, and that such use released potentially harmful amounts of it into the environment. For this reason, some industrialized countries prohibit the use of asbestos friction materials, and others including the United States require the use of asbestos to be phased out over the next few years. Therefore, there exists an urgent need for safe and effective friction materials and economical methods of manufacturing the materials into suitable friction units.

Extensive efforts have been put forth in recent years in an effort to find suitable environmentally safe materials and compositions having the desirable wear, heat and other characteristics to serve as a substitute for asbestos as friction elements in brakes and clutches. These efforts have been frustrated by the many and varied parameters involved, including the range of needs to be met between brakes and clutches as well as different types of brakes and different types of clutches. For example, different size vehicles require different size friction pads for both brakes and clutches and often have other variables including higher operating forces and temperatures. Brake pads used with rotating discs have different conditions than shoes used with brake drums. Also clutches used with automatic transmissions have different conditions from clutches used with manual or stick shift transmissions.

Attempts to satisfy the need for long life, high friction heat resistant friction materials have included proposals to utilize various chopped fibers molded in a bonding matrix, such as a resin. The friction unit is formed in the traditional fashion by a molding process, with the fibers and other components randomly oriented and placed in a binder, such as either a dry powder resin cured under heat and pressure, or placed in a liquid resin in a mold and cured. Examples of these compositions and manufacturing methods are disclosed in U.S. Pat. No. 4,119,591, granted Oct. 10, 1978 to Aldrich, U.S. Pat. No. 4,259,397, granted Mar. 31, 1981 to Saito et al., and U.S. Pat. No. 4,432,922, granted Feb. 21, 1984 to Kaufman et al.

However, friction units made by this method are expensive to manufacture and have not been satisfactory, because of their lack of uniformity in performance and durability. For example, units from the same batch may vary as much as 35% in performance characteristics. The non-uniformity of results has been found to be caused largely by a non-uniformity of distribution and orientation of the fiber and other components in the matrix. This not only creates expensive inspection and quality control problems, it can also create maintenance problems, and sometimes even hazardous conditions. For example, pads that have been matched for performance at initial installation may vary over their useful life.

Throughout the past several years, the applicant has developed extensive improvements in compositions and structures as well as in pultrusion methods of manufacture of composite friction elements for brakes and clutches. Many of these improvements are embodied in the applicants U.S. Pat. No. 5,156,787, entitled "PULTRUSION METHOD OF MAKING BRAKE LININGS"; U.S. Pat. No. 5,462,620, entitled "CONTINUOUS PULTRUSION METHOD OF MAKING FRICTION UNITS"; U.S. Pat. No. 5,495,922, entitled "UNIFORM COMPOSITE FRICTION UNITS; and U.S. Pat. No. 5,690,770 entitled "PUL TRUSION METHOD OF MAKING COMPOSITE FRICTION UNITS. However, the applicant's continuous work on perfecting these compositions, structures and methods indicate that further improvements in both compositions and methods of manufacture are desirable and consequently have been developed by the applicant. For example, improved mechanical properties, compositions and structures were developed as well as improvements in pultrusion manufacturing methods.

Now then, further improvements are desirable in compositions, structures and methods of manufacture. Accordingly, it is desirable that improved compositions, structures and methods of manufacture be available to overcome the above and other problems of the prior art.

SUMMARY OF THE INVENTION

According to one aspect, a system for continuous process manufacturing of composite friction units comprises one or more array gates, a resin plenum, and a forming die. The one or more array gates comprise a plurality of cutouts, each of the plurality of cutouts sized to receive one reinforcing fiber fabric of a plurality of reinforcing fiber fabrics therethrough. The resin plenum comprises a plenum chamber within a body and a plurality of dispensing tube assemblies in fluid communication with the plenum chamber, each of the plurality of dispensing tube assemblies comprising a plurality of dispensing bores positioned to dispense resin pumped into the plenum chamber onto one reinforcing fiber fabric of the plurality of reinforcing fiber fabrics. The forming die is positioned to receive the plurality of reinforcing fiber fabrics after the resin plenum has dispensed resin onto each one of the plurality of reinforcing fiber fabrics, the forming die configured to form a composite panel from the plurality of reinforcing fiber fabrics as the plurality of reinforcing fiber fabrics pass through the forming die.

Various implementations and embodiments may comprise one or more of the following. Each of the plurality of dispensing tube assemblies may comprise an inner dispensing tube removably coupled to the body at a first end of the inner dispensing tube and each inner dispensing tube may comprise an inner tube passage in fluid communication with the plenum chamber, an end plug plugging the inner tube passage opposite the first end of the inner dispensing tube, and the plurality of dispensing bores. The plurality of dispensing bores may extend through the inner dispensing tube such that the dispensing bores are in fluid communication with the inner tube passage. Each of the plurality of dispensing tube assemblies may comprise an outer dispensing tube rotatably coupled to the inner dispensing tube, and the outer dispensing tube may comprise an outer tube passage that interfaces with at least a portion of the inner tube passage. Each outer dispensing tube may comprise a flow control slot and the outer dispensing tube may be selectively rotatable between at least an open position wherein the flow control slot is aligned with the plurality of dispensing bores such that the flow control slot is in fluid communication with the inner tube passage and the plurality of dispensing bores dispense resin when resin is pumped in the resin plenum, and a closed position wherein the flow control slow is not aligned with the plurality of dispensing bores such that the fluid control slot is not in fluid communication with the inner tube passage and the plurality of dispensing bores do not dispense resin. Each outer dispensing tube may further a flow control fitting configured to rotate the outer dispensing tube between the closed position and the open position. The body of the resin plenum may comprise a cylindrical body and the resin plenum may comprise an inlet valve positioned proximate a bottom end of the cylindrical body and an outlet valve positioned proximate a top end of the cylindrical body. A pre-form positioned between the resin plenum and the forming die, the pre-form comprising a loading opening facing the resin plenum and sized to receive the plurality of reinforcing fiber fabrics, an exit opening facing the forming die, and a channel that narrows between loading opening and the exit opening. The at least one fabric array gate may comprise two fabric array gates each comprising a plurality of cutouts positioned to receive a different one of the plurality of reinforcing fiber fabrics, wherein the resin plenum is positioned between the two fabric array gates and the pre-form is positioned between one of the two fabric array gates and the forming die. The at least one fabric array gate may comprise one fabric array gate comprising a plurality of cutouts and one heater array comprising a plurality of electric tube heaters, each of the plurality of electric tube heaters positioned to interface a different one of the plurality of reinforcing fiber fabrics after resin from the resin plenum has been dispensed on the plurality of reinforcing fiber fabrics, and wherein the resin plenum is positioned between the fabric array gate and the heater array, the heater array is positioned between the resin plenum and the forming die, and the pre-form is positioned between the heater array and the forming die.

According to another aspect, a continuous process for manufacturing composite friction units comprises pulling a plurality of reinforcing fiber fabrics through a plurality of cutouts of a first fabric array gate, each one of the plurality of reinforcing fiber fabrics being pulled through a different one of the plurality of cutouts on the first fabrics array gate; wetting the plurality of reinforcing fiber fabrics with a resin material dispensed from a plurality of dispensing tube assemblies, each one of the plurality of reinforcing fiber fabrics being wetted with a different one of the plurality of dispensing tube assemblies; and pulling the wetted plurality of reinforcing fiber fabrics through a composite forming die for forming a body.

Various implementations and embodiments may comprise one or more of the following. Pumping the resin material into a resin plenum comprising a resin chamber in fluid communication with the plurality of dispensing tube assemblies. Each of the plurality of dispensing assemblies may comprise an inner dispensing tube comprising an inner tube passage in fluid communication with the plenum chamber and a plurality of dispensing bores, and an outer dispensing tube rotatably coupled to the inner tube and comprising an outer tube passage that interfaces with at least a portion of the inner dispensing tube and a flow control slot. Rotating each outer dispensing tube to an open position wherein the flow control slot is aligned with the plurality of dispensing bores of the inner dispensing tube such that the resin from the resin plenum is dispensed through the plurality of dispensing bores and the flow control slot to wet the reinforcing fiber fabric. Rotating each outer dispensing tube to a closed position wherein the flow control slot is not aligned with the plurality of dispensing bores of the inner dispensing tube such that the resin from the resin plenum is prevented from being dispensed through the plurality of dispensing bores by the outer dispensing tube. Pumping the resin material into the resin plenum may comprise pumping the resin material into the resin plenum from an inlet valve proximate a bottom end of the resin plenum with each outer dispensing tube of the plurality of dispensing tube assemblies in the closed position until the resin material has filled the resin chamber and each inner tube passage. Pulling the wetted plurality of reinforcing fiber fabrics through a plurality of cutouts of a second fabric array gate, each one of the wetted plurality of reinforcing fiber fabrics being pulled through a different one of the plurality of cutouts of the second fabrics array gate. Pulling the wetted plurality of reinforcing fiber fabrics through a narrowing channel of a pre-form after the wetted plurality of reinforcing fiber fabrics have been pulled through the second fabric array gate and before the wetted plurality of reinforcing fiber fabrics have been pulled through the composite forming die. Heating the wetted plurality of reinforcing fiber fabrics by pulling the wetted plurality of reinforcing fiber fabrics through a heater array comprising a plurality of electric tube heaters, each one of the wetted plurality of reinforcing fiber fabrics interfacing with a different one of the plurality of electric tube heaters. Pulling the heated and wetted plurality of reinforcing fiber fabrics through a narrowing channel of a pre-form after the heated and wetted plurality of reinforcing fiber fabrics have been pulled through the heater array and before the heated and wetted plurality of reinforcing fiber fabrics have been pulled through the composite forming die.

According to another aspect, a resin plenum comprises a body and a plurality of dispensing tube assemblies. The body comprises a plenum chamber within the body, an outlet valve in fluid communication with the plenum chamber, and an inlet valve in fluid communication with the plenum chamber. The plurality of dispensing tube assemblies are coupled to the hollow body, and comprise an inner dispensing tube coupled to the body at a first end of the inner dispensing tube and comprising an inner tube passage in fluid communication with the plenum chamber, an end plug plugging the inner tube passage opposite the first end of the inner dispensing tube, and a plurality of dispensing bores extending through the inner dispensing tube such that the dispensing bores are in fluid communication with the inner tube passage.

Various implementations and embodiments may comprise one or more of the following. Each of the plurality of dispensing tube assemblies may comprise an outer dispensing tube rotatably coupled to the inner dispensing tube, the outer dispensing tube comprising an outer tube passage that interfaces with at least a portion of the inner tube passage. Each outer dispensing tube may comprise a flow control slot and the outer dispensing tube may be selectively rotatable between at least an open position wherein the flow control slot is aligned with the plurality of dispensing bores such that the flow control slot is in fluid communication with the inner tube passage, and a closed position wherein the flow control slow is not aligned with the plurality of dispensing bores such that the fluid control slot is not in fluid communication with the inner tube passage. Each outer dispensing tube may comprise a flow control fitting configured to rotate the outer dispensing tube between the closed position and the open position. The body may comprise a cylindrical body, and wherein the inlet valve positioned proximate a bottom end of the cylindrical body and the outlet valve is positioned proximate a top end of the cylindrical body.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

The above and other objects and advantages of the present invention will become apparent from the following description when read in conjunction with the accompanying drawings wherein:

FIG. 10 is a perspective view schematically illustrating an apparatus and a preferred method of including a secondary material to provide an integral backing or reinforcement portion toward carrying out the invention;

FIG. 11 is a perspective view illustrating one product produced in accordance with the invention;

FIG. 16 is a perspective view of an inner dispensing tube with a portion of the inner dispensing tube removed to view an inner tube passage of the inner dispensing tube;

FIG. 17 is a perspective of an outer dispensing tube with a portion of the outer dispensing tube removed to view outer tube passage of the outer dispensing tube, with broken lines depicting aspects of the outer dispensing tube not visible from the perspective view;

FIG. 18A is a perspective view of a dispensing tube assembly with the outer dispensing tube in a closed position and with a portion of the outer tube assembly removed to view the inner dispensing tube rotatably coupled partially within the outer dispensing tube, with broken lines depicting aspects of the inner dispensing tube not visible from the perspective view;

FIG. 18B is a perspective view of a dispensing tube assembly with the outer dispensing tube in an open position and with a portion of the outer tube assembly removed to view the inner dispensing tube rotatably coupled partially within the outer dispensing tube;

FIG. 18C is a perspective view of a dispensing tube assembly with the outer dispensing tube in an open position and dispensing resin onto a reinforcing fiber fabric, and with a portion of the outer tube assembly removed to view the inner dispensing tube rotatably coupled partially within the outer dispensing tube;

FIG. 19 is a perspective view of a forming die, with broken lines depicting aspects of the forming die not visible from the perspective view;

DETAILED DESCRIPTION

The present invention is directed to improvements in a process known as pultrusion for the production of articles from composite materials. The pultrusion process is a process wherein products or articles are formed in a die by pulling the materials through the die where they are shaped as to at least one significant dimension or configuration in the process. This distinguishes over the extrusion process wherein materials are forced or pushed through a die under pressure and alternative processes whereby products are molded individually in pressure cavity dies.

Figure 1:
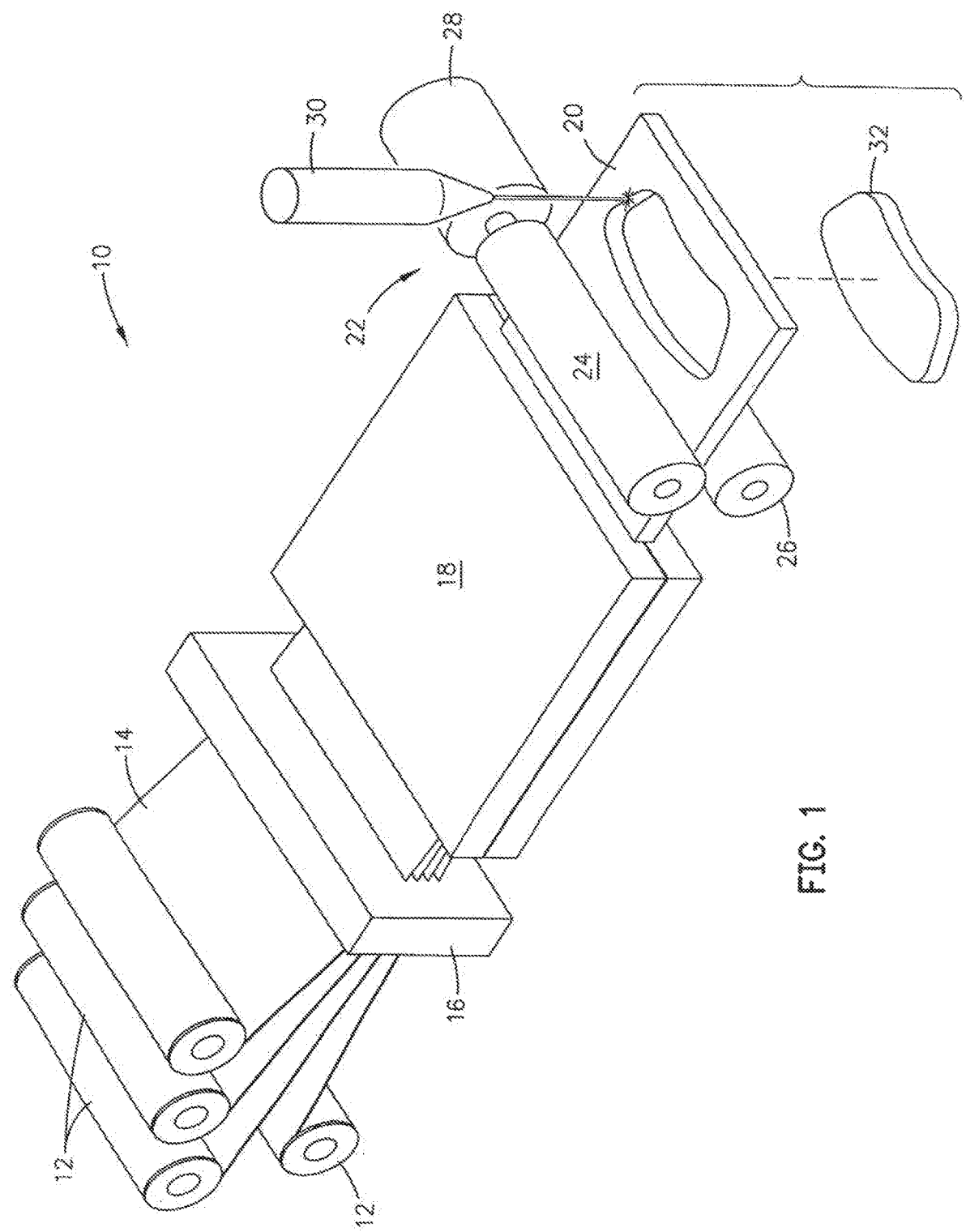
FIG. 1 is a perspective view schematically illustrating an apparatus and a preferred method of carrying out the invention.

Referring to FIG. 1 of the drawing, there is schematically illustrated an exemplary system for carrying out an exemplary series of steps of producing linings for brakes and clutches in accordance with the invention. The system, designated generally by the numeral 10, comprises source of reinforcing fiber or fabric such as one or more spools or rolls 12 from which a panel 14 of a plurality of strands of an elongated continuous fiber or arrays of fiber are drawn. The panels or arrays of fibers are impregnated with a suitable resin such as by being passed through suitable injection chamber or wetting bath 16 of a suitable resin such as a phenolic resin and through a forming die 18 from which a composite panel 20 emerges.

The panels of reinforcing fibers are pulled through the die 18 by suitable pulling or traction means 22 such as a roller traction device as illustrated. The illustrated traction device comprises a pair of rollers 24 and 26 between which the panel 20 passes and by which it is gripped and pulled through the die. The rollers may be driven by a suitable motor 28 which may be powered by any suitable means such as electric, air, hydraulic and other suitable power means. Other types of traction devices such as air or hydraulic powered reciprocating pulling grippers or tractors (not shown) may also be used. After the panel has emerged from the die the desired shape parts are cut from it by any suitable cutting means 30 such as a water jet, abrasive cutter, laser, plasma, stamping or other means.

As illustrated in FIG. 1, the emerging panel 20 is cut into brake pads of suitable shape, such as, an arcuate configuration. This cutting may be accomplished by any suitable cutting means such as a water jet, abrasive cutter, laser, plasma, stamping or other means. The cutting process will depend to an extent on the thickness and content of the material. Relatively thin materials, such as for small brake pads and clutch plates, may be cut by stamping with a die cutter or other suitable means. Certain clutch plates and abrasive discs for various applications may be as thin as a single layer of woven reinforcing fibers. Thicker materials such as for heavy duty brake pads and shoes will require other cutting means such as water jet or the like.

Figure 2:
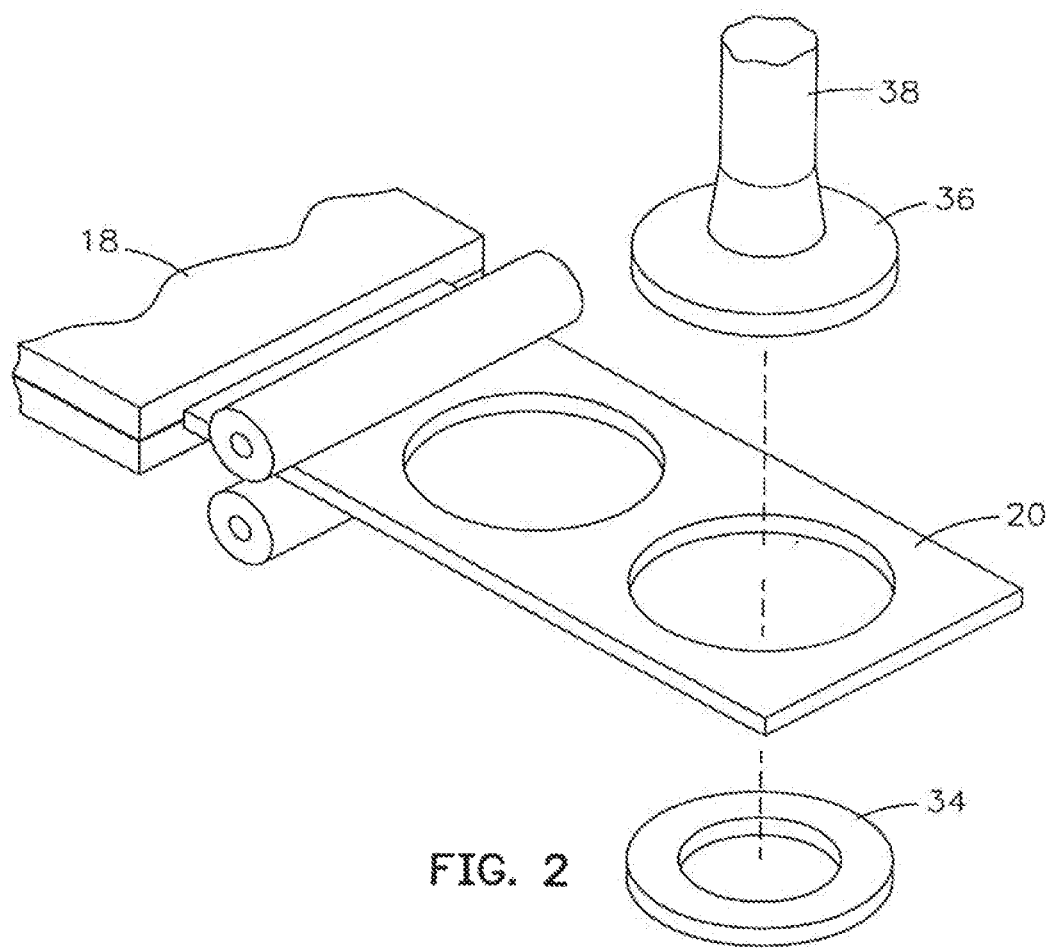
FIG. 2 is a view like FIG. 1 illustrating the method of making clutch linings in accordance with the invention.

As illustrated in FIG. 2, the emerging panel 20 may be cut into clutch pads or discs of a ring or annular configuration. This cutting may be accomplished by means of a die cutter 36 powered by an air or hydraulic cylinder 38. Because the materials are relatively thin such as for clutch plates, they can be easily cut by stamping with a die cutter. Clutch plates for some applications such as in automatic transmissions may be as thin as a single layer of woven reinforcing fibers and may include an integral backing or reinforcement portion.

The combination of fibers and resin are shaped at least as to certain dimensions and configurations of portions of the articles in the die and cured by heat prior to emerging from the die. In the illustrated embodiment, a generally flat rectangular panel 20 is formed from which brake or clutch pads 32 are cut or stamped. This is a continuous process forming at least some portions and dimensions such as the thickness and friction surface of an article of manufacture. The fibers may be in the form of individual strands, woven fabrics, matting, or stitched fabrics or combinations of them. However, a preferred form of the reinforcing fibers is in a woven panel or matting wherein the primary fibers are in the machine direction and cross woven fibers are at right angles to the primary fibers or strands. The cross fibers may in some cases be alternately in other than ninety degrees (90) to the primary fibers.

Figure 3:
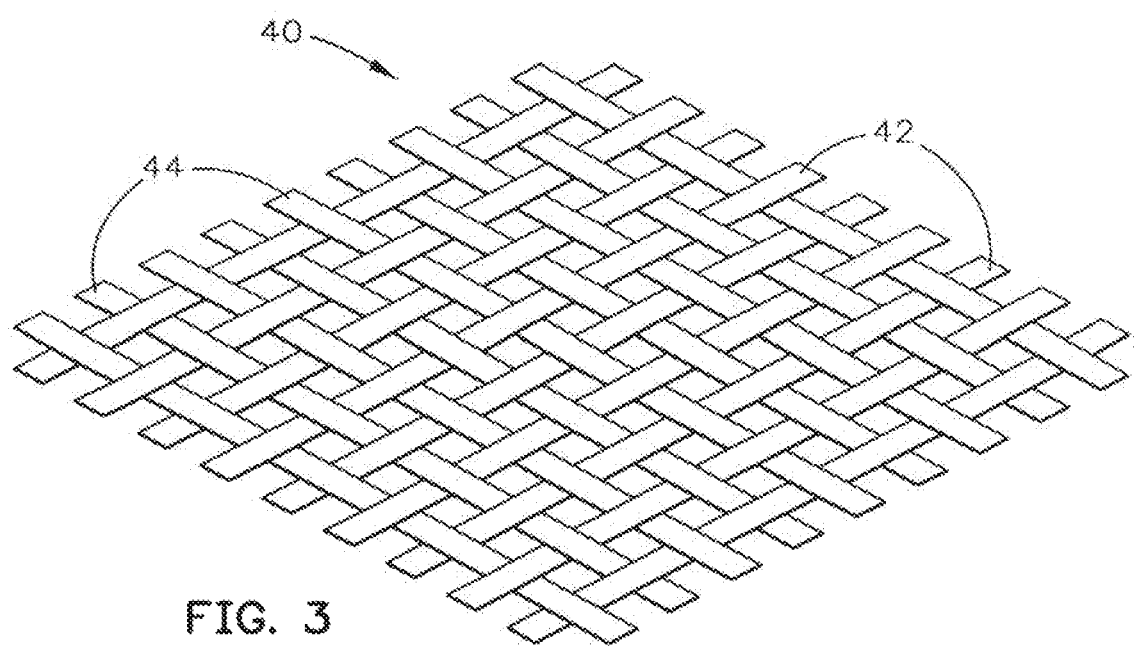
FIG. 3 is a perspective view of a typical woven panel of reinforcing fibers in accordance with the invention.

Referring to FIG. 3, an exemplary preferred reinforcing panel is illustrated and designated generally by the numeral 40. The panel is shown as a traditional weave of fibers 42 which may be primary fibers extending in the machine or pull direction. Cross fibers 44 which may be considered secondary fibers extend substantially ninety degrees across the fibers 42 in a traditional weave. The illustrated fibers 42 and 44 may be a single strand or fiber or may be a string of multiple fibers of the same or different kind. The primary reinforcing fibers 42 and 44 for the brake pads or linings are preferably glass fiber, but the pad may contain other materials and fibers or combinations thereof. In addition, other fibers may be woven or distributed in with the glass fibers in various selected distributions and proportions to alter and or enhance certain characteristics. For example, various fibers may be distributed in various concentrations substantially uniformly throughout the unit for optimizing various parameters such as inner laminar shear strength, wear, fade, and cooling. The addition of secondary reinforcing fibers can be accomplished in several different ways.

Many different fibers or strands and combinations may be utilized, including but not limited to glass, rock, ceramic, carbon, graphite, aramid, Nomex, Kevlar, wool and cotton and fibers of other organic and inorganic materials. Various metallic fibers such as copper and aluminum, may also be utilized in various proportions with non-metallic fibers. In the preferred composition fiber content will range from 20 weight % to 60 weight %. Optic fibers may also be included in order to provide active test and performance monitoring of the finished parts for evaluation or end use purposes.

The fiber reinforcement design, manufacturing system and process, as illustrated, provide for the controlled predetermined orientation of the fibers, as well as the controlled predetermined uniformity and density of the primary fibers within the resin matrix. For example, the composition of the friction device determines many of its characteristics, such as its durability, heat resistance, and friction resistance. With this process, the primary fibers may be controllably distributed and oriented uniformly at any suitable angle to the friction surface of the brake pad or friction device. Thus, the process and materials have the capability of providing superior, predictable and consistent performance.

The process may include the addition of secondary fibers that extend transverse to the primary fibers in order to add shear strength and other mechanical properties to the units.

The panels 16 of fibers or strands are coated or wetted by a resin in any suitable manner either prior to (pre-preg) or during the pultrusion process. In the illustrated embodiment the fibers are shown to pass into or through a bath or injector chamber 16 of a suitable liquid resin contained within a reservoir 20 for wetting or impregnating the fibers or strands. The fibers can also be impregnated with resin prior to process (pre-preg) or they may be wetted by resin injection or other suitable means during the pultrusion process or as by drawing them through a bath or by pumping resin into them from a header that surrounds the rovings or panels of fibers. The fibers will in reality number in the hundreds or thousands, preferably in a matting of fibers in several rows many of which may be parallel and stitched together or interleaved with other layers of different orientation. In the illustrated preferred system, the fibers are in the form of woven panels or mats formed or cut to the width of the die and guided through into the die 18 for imparting at least a part of the final shape or configuration of the friction units.

The strands, particularly if glass fibers, may require a sizing treatment, i.e. application of a compound or chemical to insure a good or complete wetting of the fibers and a good bond between the fibers and matrix and between layers of fibers. A bulked roving (bunch of strands or fibers) is preferably used. Bulked roving is produced by a process in which a standard roving is fractured or splintered by forced cold air. This provides two useful properties, 1) increased diameter which assists in providing fill to low glass content pultrusion, and 2) the "splinters" provide for good mechanical bonding in all axes within the resin matrix.

The resin impregnated or wetted panels of fibers are passed or pulled through the die 18, where they are shaped into at least part of the desired configuration and are at least partially, if not fully, cured. The fiber and resin composition is preferably at least partially cured in the die by any suitable means such as endothermic or radiant heat or other means, and the fibers will thereby be put in and remain in tension in the body of the unit. The composite unit emerges, or more particularly is pulled in tension from the die in the form of an elongated continuous bar or panel 20 having at least part of the peripheral configuration of the brake or clutch pad or other article being manufactured. In the case of brake and clutch pads, the bar or panel preferably has the friction and mounting surface configuration of the final pad. The bar or panel 20 is pulled from the die 18 by suitable means, such as hydraulic pullers, tractors (not shown) or the like, and positioned to be cut into individual friction or brake pad units or pieces in the illustrated embodiment. The pultrusion process provides a substantially controlled composition with predetermined distribution and orientation of the primary fibers throughout the body of the friction unit. This helps in maintaining a high degree of uniformity among the units as well as in the various parameters of the units and their end performance.

It may be desirable in some instances to provide a different angularity to the fibers in relation to the friction surface. For example, it may be desirable to have the fibers at an angle to the friction surface of up to as much as forty five degrees. This can be accomplished by cutting the friction units from the bar at the desired angle to the axis thereof.

The brake pads, upon being cut from the panel, may be placed on a conveyer belt or otherwise moved into position for further processing such as attachment to a backing plate. The pads or linings may be attached such as adhesively bonded to a backing plate or shoe. The pads are then accumulated by suitable manner in a suitable storage container or bin where they are then packaged and shipped. This provides a highly efficient and economical manufacturing process compared to traditional process techniques.

The density and mixture of primary fibers as well as secondary fibers may be varied to suit the particular application. Specifically, in the case of brake shoes, however, the orientation of the primary fibers may be in a drum transverse to the drum surface. The fibers are pulled through a die having the curve or arc of the desired shoe and selectively cut width-wise. In this application the cut surface does not represent the friction surface. A secondary preparation step, such as grinding, may be performed to attain the desired surface. This is also true for various pad and clutch applicators as described herein.

While brake pads are illustrated in the process, it is apparent that clutch friction units and brake shoe linings as well as abrasive friction discs may also be manufactured by this process. The die is set to shape one peripheral surface or outline of the emerging articles and can include annular shapes. Otherwise, the die can be set to provide at least one dimension of the article to be manufactured. In the case of pads for disc brakes, in one embodiment the fibers are oriented uniformly at an angle preferably normal to the friction surface for the highest efficiency of manufacture. However, in certain applications, an orientation parallel to the friction surface may be satisfactory or even preferred for manufacturing as well as performance.

The shoe linings may be formed by the pultrusion process in the form of a thin arcuate slab, and the linings cut to width as described above with respect to pads. This provides an economical technique for producing consistently uniform units. However, where orientation of the fibers normal to the friction surface is desired, a rectangular slab may be cut along an arc to form the curved friction surfaces.

The articles may be cut from the pultruded bar by any suitable means, such as by laser, water or other means. The present method and process provides a highly efficient manufacturing process for the production of high quality friction units that are asbestos free with a controlled uniform composition and quality. The pultrusion process enables rapid production and the careful control of fiber density filler and friction formulation, mixture, and orientation on a continuous basis.

The primary reinforcing fibers 14 for the brake pads or linings are preferably glass fiber, but the pad may contain other materials and fibers or combinations thereof. In addition, other fibers may be woven or distributed in with the glass fibers in various selected distributions and proportions to alter and or enhance certain characteristics. For example, various fibers may be distributed in various concentrations substantially uniformly throughout the unit for optimizing various parameters such as inner laminar shear strength, wear, fade, and cooling. The addition of secondary reinforcing fibers can be accomplished in several ways. Many different fibers or strands and combinations may be utilized, including but not limited to glass, rock, ceramic, carbon, graphite, aramid, Nomex, wool and cotton fibers or other organic and inorganic materials. Various metallic fibers such as copper and aluminum may also be utilized in various proportions with non-metallic fibers.

Figure 4:
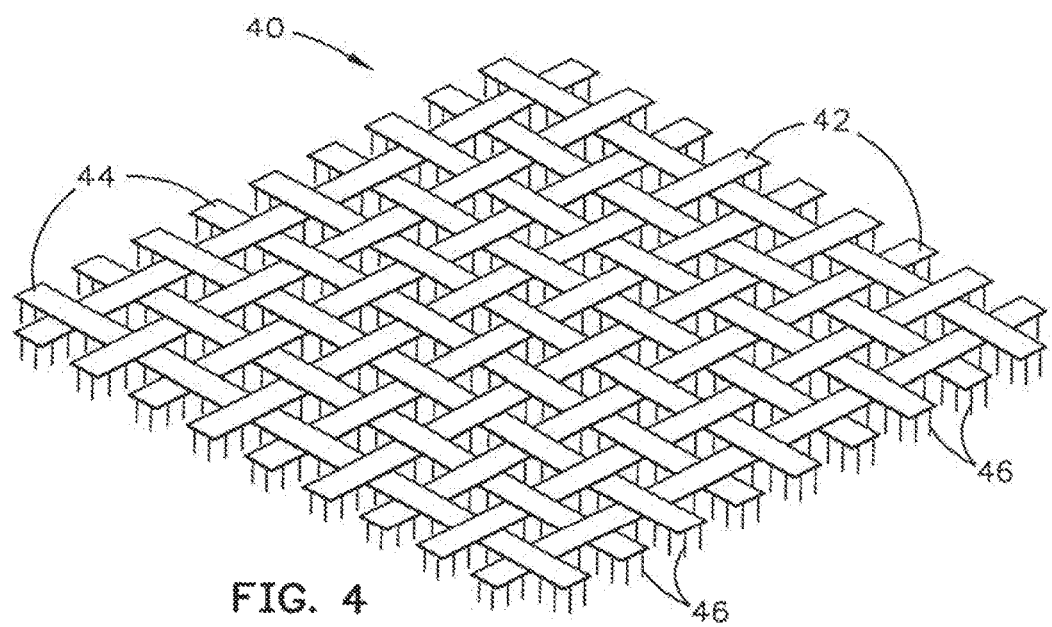
FIG. 4 is a view like FIG. 3 illustrating the woven panel of FIG. 3 following a needling treatment for carrying out a step of a preferred method of the invention.
Figure 5:
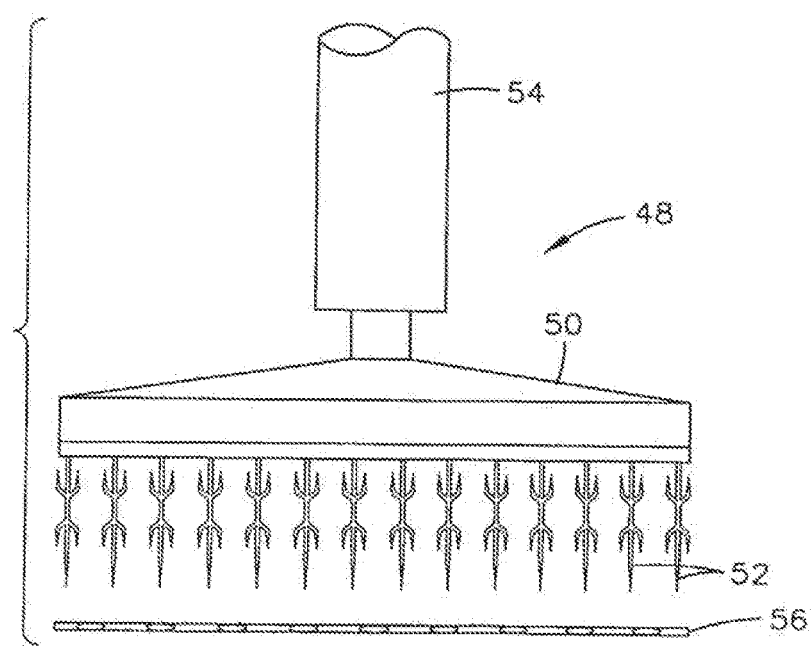
FIG. 5 is an elevation view illustrating a needling of multiple panels of reinforcing panels.

The illustrated preferred process utilizes multiple layered fabric panels of reinforcing fibers. In some instances additional shear strength may be required between the layers of reinforcing fibers. One preferred method of obtaining sufficient strength is by the method of needling as illustrated in FIGS. 4 and 5. This process comprises passing multiple barbed needles down through the panel of fibers as the panel passes beneath the needles. As shown, the panel 40 has portions or strands of fibers 46, referred to herein as downturns, extending down from the panel. Similar strands of fiber may also extend upward if desired. In a preferred method several layers of the reinforcing panels come together and thereby co-mingle their respective needled portions resulting in a joining or stapling the woven panels together. Fibers from each panel are forced into adjacent panels resulting in a high strength mechanical bond between adjacent panels. This improves bonding between the layers and inner layer shear strength in the final product and helps to limit distortion caused by the pulling forces of pultrusion.

An exemplary apparatus for carrying out this needling procedure is illustrated in FIG. 5 and designated generally by the numeral 48. The apparatus comprises a support 50, which is preferably in the form of a generally rectangular panel, on which is mounted an array of a plurality of barbed needles 52. A reciprocating power unit 54 such as a hydraulic or pneumatic cylinder is connected to the support 50 and moving it upward and downward to force the needles through one or more layers or panel 56 of reinforcing fibers forming upturns and downturns as may be specifically desired. This array of upturns and downturns tend to tie the panels together once in contact with each other during processing to improve the internal or inner laminar shear strength of the final product.

Figure 6:
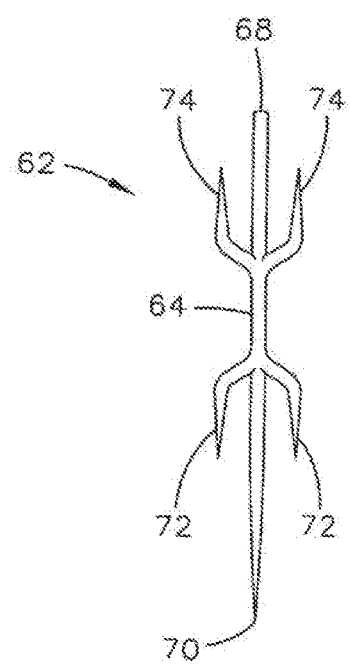
FIG. 6 is an elevation view illustrating a needle for use in the operation of FIG. 5.
Figure 7:
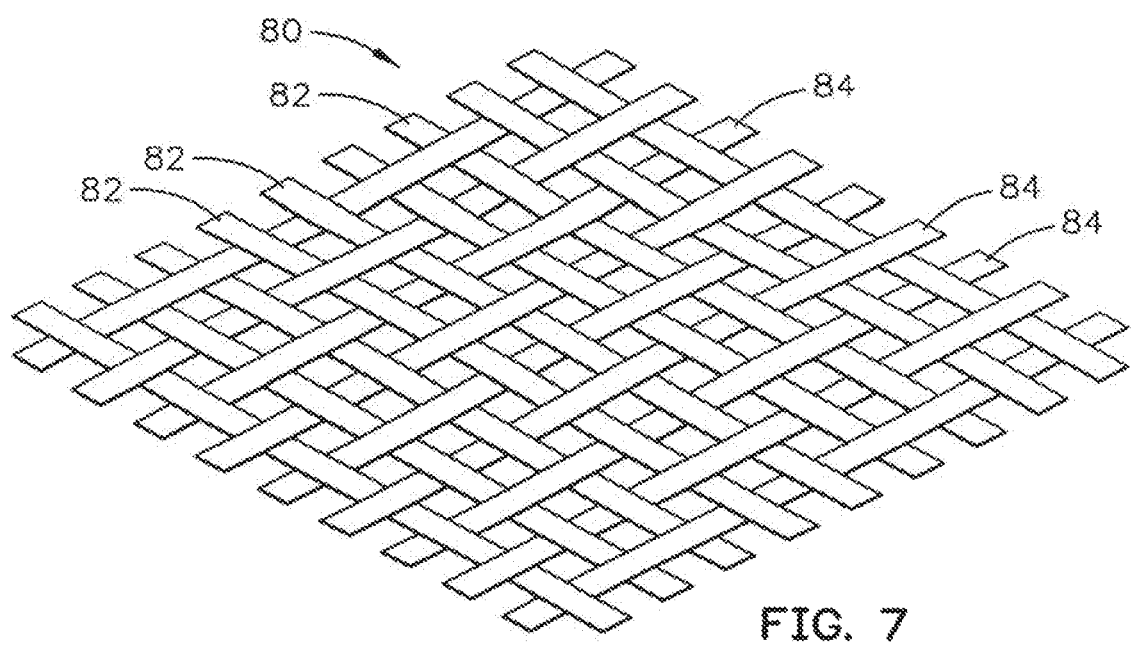
FIG. 7 a view like FIG. 3 illustrating an alternate embodiment of a woven panel for carrying out a preferred method of the invention.
Figure 8:
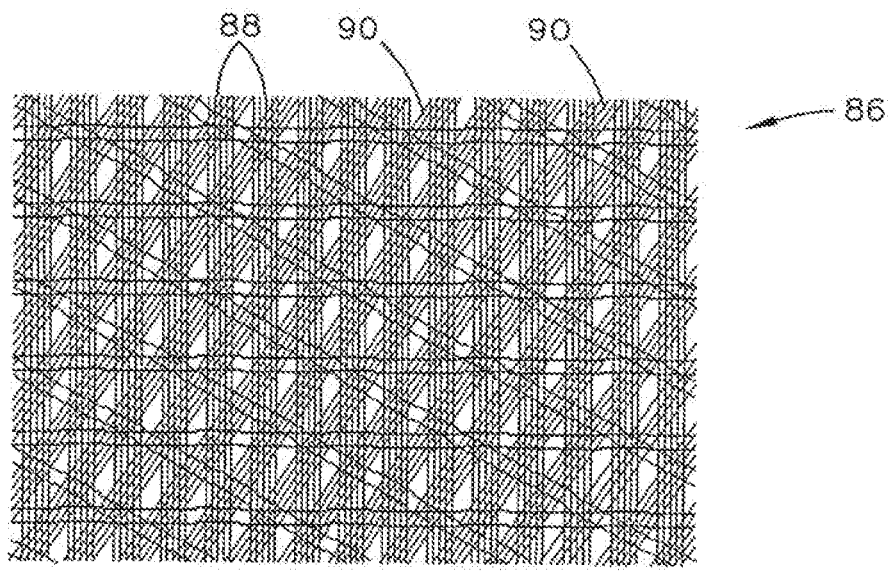
FIG. 8 is a plan view of a typical stitched panel of reinforcing fibers in accordance with the invention.
Figure 9:
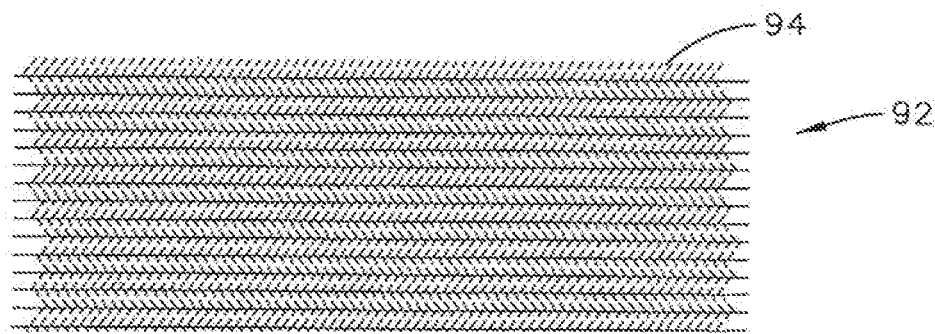
FIG. 9 is a plan view of a typical braided panel of reinforcing fibers in accordance with the invention.

Referring to FIG. 6, an exemplary embodiment of a needle is illustrated and designated generally by the numeral 62. The needle 62 comprises an elongated shank 64 having a mounting end 68 and a pointed end 70. A pair of downturned barbs 72 are formed on a lower portion of the shank pointing in the direction of the needle point. A pair of upturned barbs are formed on the shank above the down turned barbs and point toward the mounting end of the needle. The panels of matting may also be formed in any number of other ways such as illustrated in FIGS. 7, 8 and 9. Referring first to FIG. 7, a panel 80 is formed of woven fibers or strands which cross in the traditional manner. However, pairs of strands 82 extending in one direction are woven into single cross strands 84. Illustrated in FIG. 8 is a mat 86 formed of a plurality of bundles of fibers 88 (vertically oriented) secured together by stitching 90 (extending horizontally). A second panel of these is shown layered at an angle of about forty five degrees. These may be layered in many different angles from a few degrees up to 90 degrees.

FIG. 9 illustrates a braided mat 92 formed by braiding multiple strings or bundles 94 of fibers. The braiding may be relatively loose or tight as desired. Layers of these and the FIG. 8 mats or panels may also be needled for further composite reinforcement. In addition the reinforcing of a run of composite units may utilize layers of any one or combinations of two or all of these mats or panels of fibers.

Referring to FIG. 10 of the drawing, there is schematically illustrated another method for carrying out an exemplary series of steps of producing products such as friction linings for brakes and clutches in accordance with the invention. The method is carried out in substantially the same system, designated generally by the numeral 10, as previously described. The system comprises source of reinforcing fiber or fabric such as one or more spools or rolls 12 from which a panel 14 of a plurality of strands of an elongated continuous fiber or arrays of fiber are drawn. The panels or arrays of fibers are impregnated with a suitable resin such as by being passed through suitable injection chamber or wetting bath 16 of a suitable resin such as a phenolic resin and through a forming die 18 from which a composite panel 20 emerges. A backing or reinforcing panel 96 of metal or other suitable substantially rigid material is passed through the system with the resin impregnated fabric panels and is bonded thereto. The composite fabric panel and resin form a top layer bonded to the backing panel emerging from the pultrusion apparatus or system. The composite panel 98 may then be cut into the appropriate shaped units 100 having a combined friction surface 102 and backing surface 104. This forms a unit that may be used for brake or clutch rotors or other friction devices. The backing material may be any suitable material such as solid metal panel, perforated metal panel, metal screen, composites and the like. This process can eliminate the additional step of bonding.

Reinforcing panel 96 may be made of metal or other suitable substantially rigid materials. In the context of the disclosed device, a substantially rigid material has mechanical properties sufficient to provide additional stiffness or reinforcement to the device so as to impede undesirable flexing. Substantially rigid materials, as the term is used herein, have a tensile strength higher than 18,000 $lb/in^2$, and in more particular implementations between the range of 18,000 $lb/in^2$ to 290,000 $lb/in^2$. Some examples of substantially rigid materials include cast iron (18,000 $lb/in^2$), and steel, as well as other similar materials with similar strengths such as but not limited to titanium, aluminum, and metal and non-metal composites. Particular examples which fall in the middle of the acceptable range include, but are not limited to, drawn annealed steel SAE 4340 (290,000 $lb/in^2$), SAE 1300 steel (100,000 $lb/in^2$ to 240,000 $lb/in^2$), and titanium alloy 6-4 (130,000 $lb/in^2$). Those of ordinary skill in the art may describe tensile strength near the higher end of this range as rigid, in which case the reinforcing panel 96 would be referred to as a rigid panel or a substantially rigid panel. If the panel is made of metal or includes a metal or a metal alloy, the panel would be called a rigid metal panel or a substantially rigid metal panel.

Additionally, particular implementations of the disclosed device may not include a rigid backing panel in addition to the resin impregnated panels because the long fiber reinforced polymer (LFRP) composites may have similar tensile strength to steel.

One a particular composite unit is formed with an aluminum backing for producing brake rotors of light weight with a durable friction surface. The rotor may be detachably attached to a hub of an automobile to provide a reduction in the un-sprung weight of an auto suspension and wheel assembly. In an alternate method the substantially rigid core or panel may be sandwiched between fabric panels to produce a panel having opposed friction faces as illustrated in FIG. 11. As illustrated a unit 106 having a composite face 108 on one side of a substantially rigid panel 110 and a composite face 112 on the other side. These units can be used as clutch or brake rotors or other friction devices.

Figure 12:
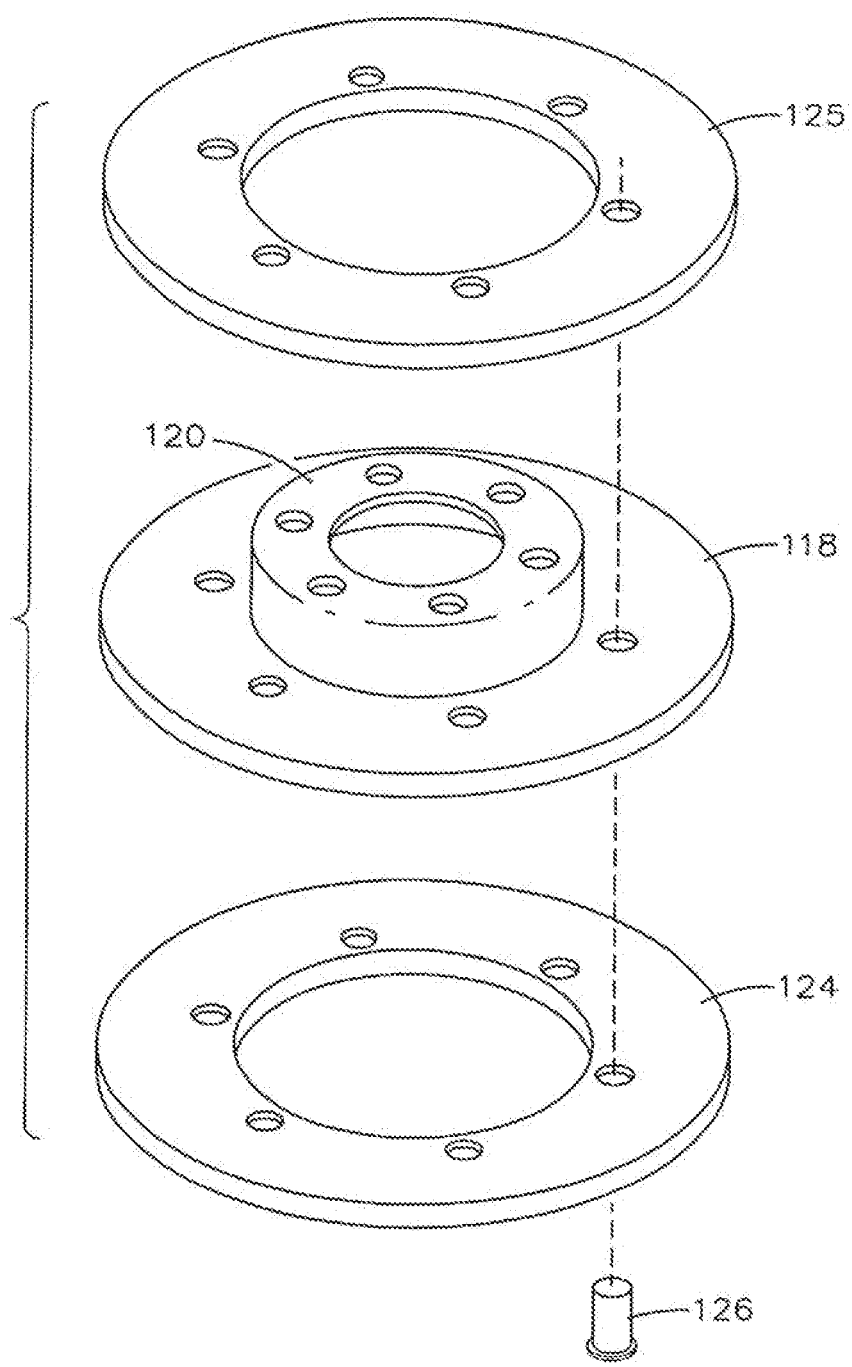
FIG. 12 is a perspective view illustrating another product produced in accordance with the invention.

Referring to FIG. 12, there is illustrated an embodiment wherein a laminate brake rotor comprises a central lightweight disc 118 having a hub 120 for detachable attachment to an axle hub of a vehicle. A pair of composite rotor discs 122 and 124 are attachable to the central disc to provide the friction surface for engagement by brake pads. This construction enables the use of light weight material such as aluminum for the central hub 118 to reduce the un-sprung weight of an auto suspension. Aluminum has been found not suitable for traditional brake rotors because it lacks sufficient hardness.

The fiber reinforcement design, manufacturing system and process, as illustrated and described herein, provide for the controlled predetermined orientation of the primary fibers, as well as the controlled predetermined uniformity and density of the primary fibers within the resin matrix. For example, the composition of the friction device determines many of its characteristics, such as its durability, heat resistance, and friction resistance. With this process, the primary fibers may be controllably distributed and oriented uniformly at any suitable angle to the friction surface of the brake pad or friction device. Thus, the process and materials have the capability of providing superior, predictable and consistent performance.

Milled or chopped fibers such as glass, ceramic, Kevlar, steel, wool or cotton fibers or other may also be added and introduced into the matrix material so that they are picked up by the primary strands of fibers as they pass through the resin. The longer chopped fibers may be in the range of from 1% to about 5% by weight of the matrix material. The milled short fibers are preferably in the approximate range of 0.015 inch to about 0.062 inch in length and dispersed randomly throughout the matrix. This dispersement of milled fibers provides multi-axis mechanical reinforcement, as well as crack and compression resistance in areas to be machined for mounting purposes. In this process, milled or chopped fibers may be mixed in the primary resin reservoir, or in the alternative two reservoirs of resin may be used. In one arrangement a first tank contains a low viscosity resin to enhance the wetting of the fibers (preferably predominately glass fibers) as they are passed through. The fibers then pass through a second tank of higher viscosity resin containing many of the fillers and chopped wool, cotton or other fibers. The chopped fibers preferably make up from about 1% to 5% of the reinforcement fibers. They will be picked up by the primary strands of fibers and will generally extend transverse to the primary fibers with proper modification of the handling equipment. Other fibers may also be used in this way. These and the transverse fibers may be used together or in the alternative to achieve the desired shear strength. Alternatively a variation of woven or striated layers may be utilized to provide desired changes in mechanical properties as may be required in the areas to be machined for mounting purposes including the use of secondary panels of composite, metal or other types of material used as an integral backing or reinforcement to the pultruded composite.

The principal matrix material may be any suitable resin that is typically thermosetting, which may require curing by one of several methods. Certain thermoplastic resins may also be desirable as referenced elsewhere herein. It may be cured, for example, by cooling, heating, or by the use of UV or other radiation or the like. However, the materials must be capable of enabling the forming of the units by the pultrusion process.

One suitable phenolic resin is available from BP Chemicals under the trademark "CELLOBOND" and product designation J2041 L. This product is described as a high viscosity phenolic for use in heat cured pultrusion, does not require any catalyst and will provide reasonably fast line speeds and cure cycles. Another suitable phenolic resin is Borden 429C available from the Borden Company and recently improved variation thereof. These resins may be present in the range of from about 30% to about 60% and provide enhanced efficiency in production. In some cases, the manufactured unit must be post cured to assure the best performance. For example, it may be baked at about 250-500 degrees Fahrenheit for one or to several hours. Preheating may also be required for larger cross sectional units. This may be taken care of in any suitable manner, such as by use of an RF oven or radiant heat system and usually requires low temperature from about 80 to 150 degrees Fahrenheit.

Another resin that is preferably added or combined with one of the above is resorcinol-modified phenolic resin available under the trademark Rescorciphen developed by INDSPEC Chemical Corporation. This resin is preferably present in the range of from about 0% to about 20% and preferably up to about 13.8% by weight. The resin may require the addition of material such as BYK 9010 in an amount of up to about 2.5% weight to control the viscosity of the mixture. The matrix material will be formulated to include heat dissipation and/or friction modifiers, such as graphite and/or non-ferrous metallic powders and/or the like. For example, from about one to ten percent by weight of one or more fillers and/or modifiers, such as graphite powder and/or one or more non-ferrous metallic powders, may be incorporated into the matrix material. Other materials include but are not limited to mineral filler, rubber powder, copper powder, ceramic powder, nut shell flour (such as walnut or cashew). These may each be in the amount of one percent (1%) to ten percent (10%) and preferably in the amount of 3% to 5% by weight. Nut flour has been found to increase the shear strength of the unit and to enhance the fade characteristics of pads or linings. During braking, heat breaks down the nut shell flour causing nut shell oil to combine chemically with the resin polymer molecule in a process known as chain branching. Thereby, the polymer becomes stronger and more able to withstand high temperatures that contribute to brake fade. The ceramic powder is preferably in the form of hollow spheres of about seven to ten microns. These have been found to serve as a mechanical lubricant in the pultrusion process and to enhance the hardness and wear characteristics of the friction units.

A preferred formulation of matrix materials includes a wetting agent in the amount of about 0.0 to 2.5%, Barytes (BaS04) of about 0.0 to 10%, Copper of about 0.0. to 20%, walnut flour of about 0 to 5.0%, Talc Nytal (CaMgSilicateIH20) of about 0.0 to 5.0%, graphite of about 0.0 to 5.0%, Zinc Oxide (friction enhancer) of about 0.0 to 10%, Aluminum Oxide (friction enhancer) of about 0.0 to 10%, brass (friction enhancer) of about 0.0 to 10%, and a mold release agent of about 0.0 to 2.5%.

The following examples are intended to illustrate but not limit the invention. While these examples are typical of formulations that have been found to be satisfactory, other formulations will occur to those of skill in the art and may be used.

Example 1

A suitable test sample of the product was produced having the composition of a wetting agent of about 0.035%, Barytes (BaSO4) of about 5.5%, Copper of about 6.9%, walnut flour of about 2.8%, Talc Nytal (CaMgSilicatelH20) of about 2.8%, graphite of about 3.5%, Zinc Oxide (friction enhancer) of about 4.1%, Aluminum Oxide (friction enhancer) of about 4.1% and Axel 1850 (mold release) of about 0.7%. The final product had about 46.0 wt % glass, about 30.30 wt % filler and about 33.7 wt % resin. The glass was PPG E type phenolic sized woven fabric.

Example 2

| Raw Material | Weight Percent |
| --- | --- |
| Phenolic Resin | 12.66 |
| Barium Sulfate | 15.19 |
| Potassium Titanate | 12.66 |
| Kevlar | 2.53 |
| Calcium Fluoride | 5.06 |
| Antimony Trisulfid | 2.53 |
| Zircon | 2.53 |
| Aluminum Oxide | 1.27 |
| Syn Graphite | 7.59 |
| Coke 9 | 2.53 |
| Cashew Particles | 7.59 |
| Rubber | 5.06 |
| Calcium Oxide | 1.27 |
| Ceramic Fiber | 3.80 |
| Vermiculite | 10.13 |
| Copper | 7.59 |

Example 3

| Raw Material | Weight Percent |
| --- | --- |
| Phenolic Resin | 10.53 |
| Barium Sulfate | 18.42 |
| Steel Wool 205 | 21.05 |
| Kevlar | 0.00 |
| Calcium Fluoride | 5.26 |
| Zinc Sulfide | 2.63 |
| Zircon | 3.95 |
| Aluminum Oxide | 1.32 |
| Syn Graphite | 7.89 |
| Coke 9 | 2.63 |
| Cashew Particles | 2.63 |
| Rubber | 5.26 |
| Calcium Oxide | 1.32 |
| Ceramic Fiber | 3.95 |
| Vermiculite | 10.53 |
| Copper | 2.63 |

Example 4

| Raw Material | Weight Percent |
| --- | --- |
| Phenolic Resin | 8.33 |
| Barium Sulfate | 16.67 |
| Steel Wool 205 | 38.86 |
| Iron Sponge | 15.63 |
| Interfibe 230 | 2.08 |
| Zinc Sulfide | 2.08 |
| Blank | 0.00 |
| Aluminum Oxide | 0.00 |
| Graphite A 505 | 6.25 |
| Coke 9 | 2.08 |
| Cashew Particles | 2.08 |
| Rubber | 4.17 |
| Vermiculite | 4.17 |

The resins may be aqueous based and contain compounds or additives known as molecular sieves to reduce by containment free by-products which may cause excessive voids in the product. Suitable such molecular sieve materials are available as both sodium activated and hydrated chabazite in several mesh sizes. These products absorb gases and water, reduce potential voids or cracks due to gases and vapor. The typical chemical names are sodium alumino silicate and calcium alumino silicate. These are in powder form and may be added in amounts of from about 1% to about 5% by weight of resin. Another additive that has been shown to reduce the amount of water vapor formed during the process is barium sulfate (BaSO4) commonly referred to as barite.

The resins may also be non-aqueous based which would eliminate or reduce the need for molecular sieves. The resin may also be low condensation resin, which produces less water by-products.

The fiber to resin matrix may vary from about one part fiber to two-part resin, up to about three part fiber to one part resin. A preferred fiber to matrix composition is from about 35% to 75% fiber to 25% to 40% resin or matrix mix. The matrix preferably has from 5% to 10% by weight of one or more of graphite powder, copper powder, aluminum powder and the aforementioned powders. In addition, aramid pulp and other synthetic fiber pulps may be added or distributed throughout the matrix material. Other materials such as 3 formulation sheets can be added as required.

Certain thermoplastic materials may be desirable for other specific applications. The thermoplastic material may, for example, be a suitable polyester and may also have components such as powders of graphite or other material to aid in friction control and the dissipation of heat. For example, a one to about ten percent by weight of graphite powder uniformly distributed throughout the thermoplastic material aids in the dissipation of heat. Alternate compositions may include small amounts of other materials, such as non-ferrous metallic powders, such as copper, aluminum or the like. For example, a one to ten percent by weight copper powder may also be utilized to enhance the dissipation of heat. Thus, the composition must be compatible with the pultrusion process and at the same time provide satisfactory friction units.

I have discovered that various proportions and compositions of materials can affect the pultrusion process as well as the performance characteristics of the brake pad and lining units. For example, many test samples with many ranges of examples of compositions have been constructed and tested in order to optimize friction units. In recent tests one of the most suitable formulation was found to be wetting agent about 0.035%, BaSO4 about 5.5%, Copper about 6.9%, walnut flour about 2.8%, Talc Nytal (CaMgSilicatelH20) about 2.8%, graphite about 3.5%, Zinc Oxide (friction enhancer) about 4.1%, Aluminum Oxide (friction enhancer) about 4.1% and mold release agent about 0.7%. The final product had about 46.0 wt % glass, about 30.30 wt % filler and about 33.7 wt % resin. The fiberglass was PPG "E" type with phenolic compatible sizing woven into fabric.

Also contemplated as part of this disclosure are additional embodiments of systems and methods for a continuous process for manufacturing composite friction units. It is contemplated that any reinforcing fiber fabrics 14 and resin compositions described elsewhere in this document or otherwise known in the art may be utilized in additional embodiments of systems and methods for a continuous process for manufacturing composite friction units without departing from the scope of this disclosure. According to some aspects, the systems and methods for a continuous process for manufacturing composite friction units comprises but is not limited to a pull-through rate of approximately 6 to approximately 30 linear inches per minute and the width of the reinforcing fiber fabric 14 is approximately 4 to approximately 36 inches, the thickness of the reinforcing fiber fabric 14 is approximately 0.075 to approximately 0.25 inch. Advantages of the composite material created with a continuous process for manufacturing composite friction units described herein include but are not limited to improved second couple wear, selectable friction levels, near-zero performance variability from part-to-part and batch-to-batch, consistent cold/hot performance and fade recovery, increased mechanical strength that allows for lighter and thinner backing plates, and increased cost effectiveness.

Figure 13:
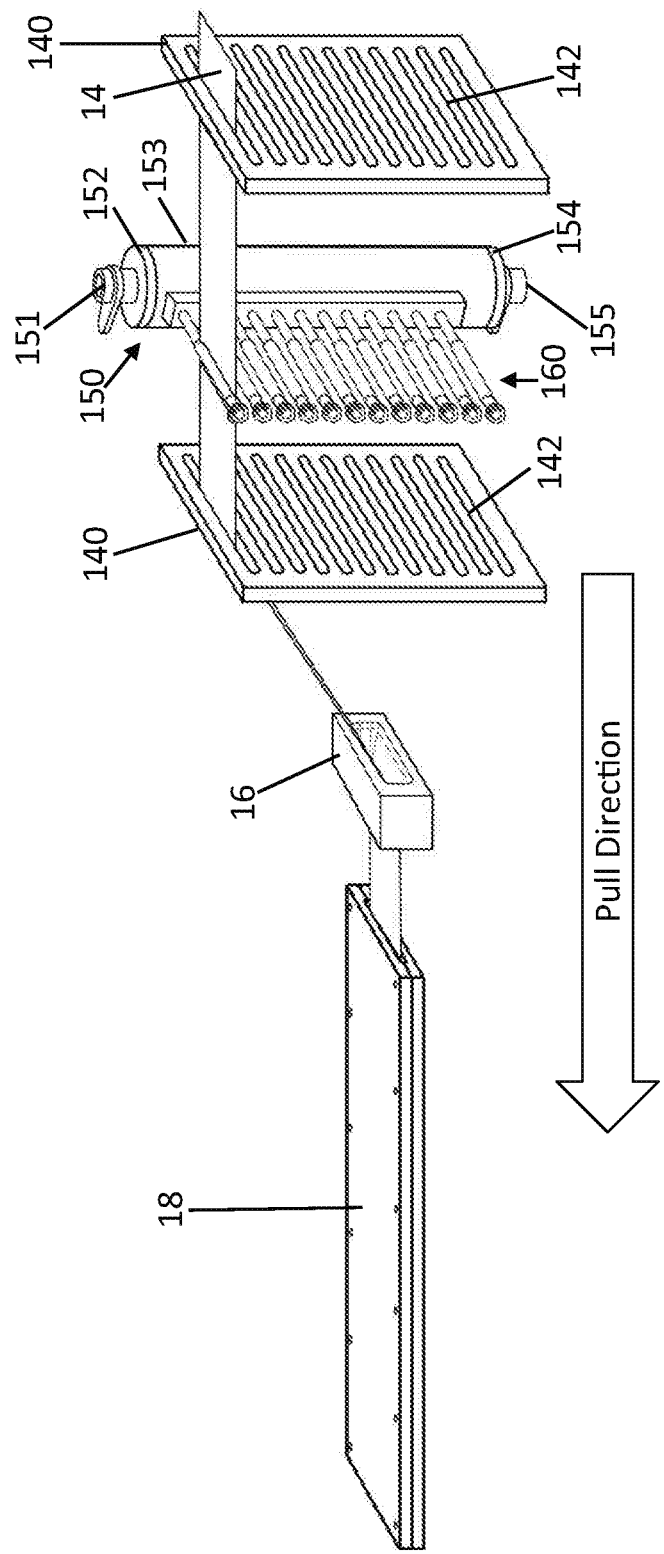
FIG. 13 is a perspective view schematically illustrating a first embodiment of a system and continuous process for manufacturing composition friction units.
Figure 14:
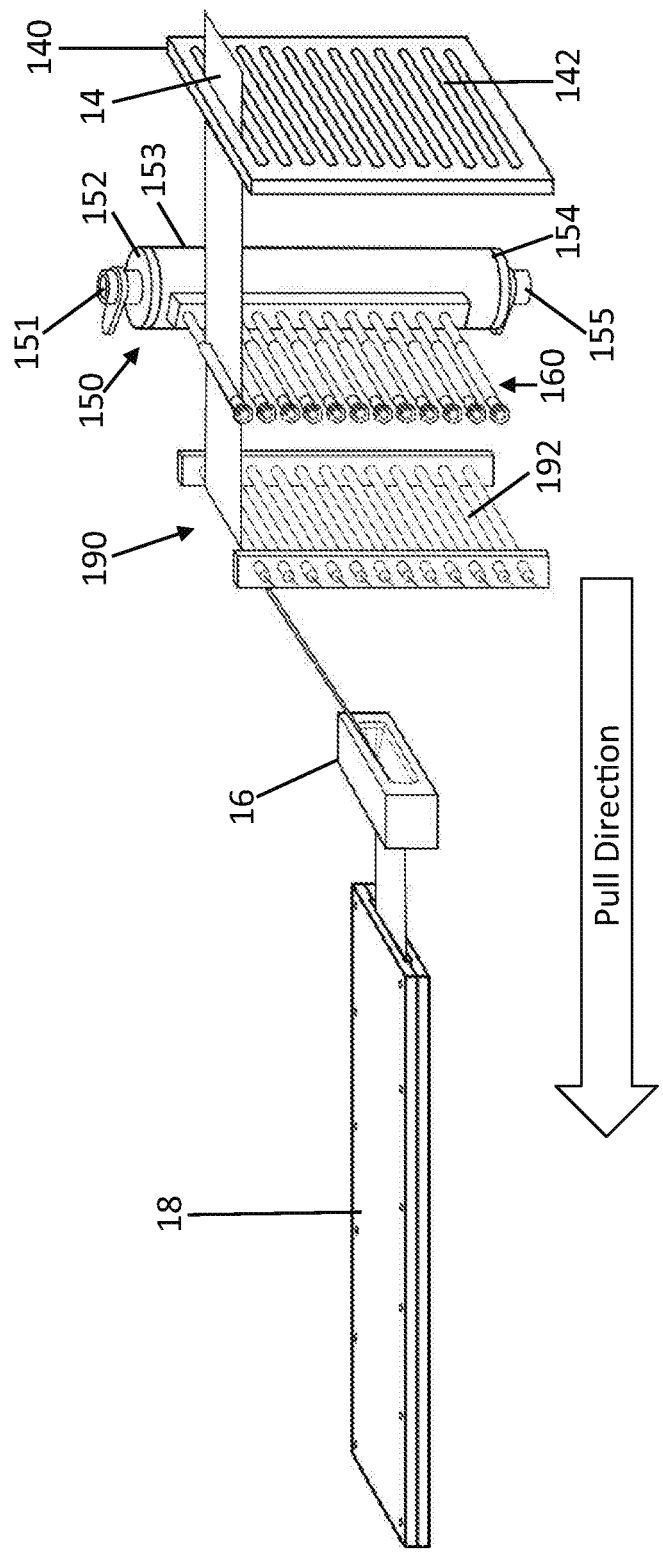
FIG. 14 is a perspective view schematically illustrating a second embodiment of a system and continuous process for manufacturing composition friction units.

FIGS. 13 and 14 depict two non-limiting embodiments of continuous processes for manufacturing composite friction units. The embodiments depicted in FIGS. 13 and 14 are for schematic purposes, as one of ordinary skill in the art will understand application and incorporation of the depicted elements in other systems and methods known in the art. In each of the depicted embodiments, the reinforcing fiber fabric is pulled through the system from right to left. It is contemplated that aspects of methods and systems for continuous processes for manufacturing composite friction units prior to pulling the reinforcing fabric 14 through the first fabric gate and aspects of methods and systems for continuous processes for manufacturing composite friction units after pulling the composite material from the forming die 18 would be similar to those described elsewhere in this document or otherwise known in the art.

Figure 15B:
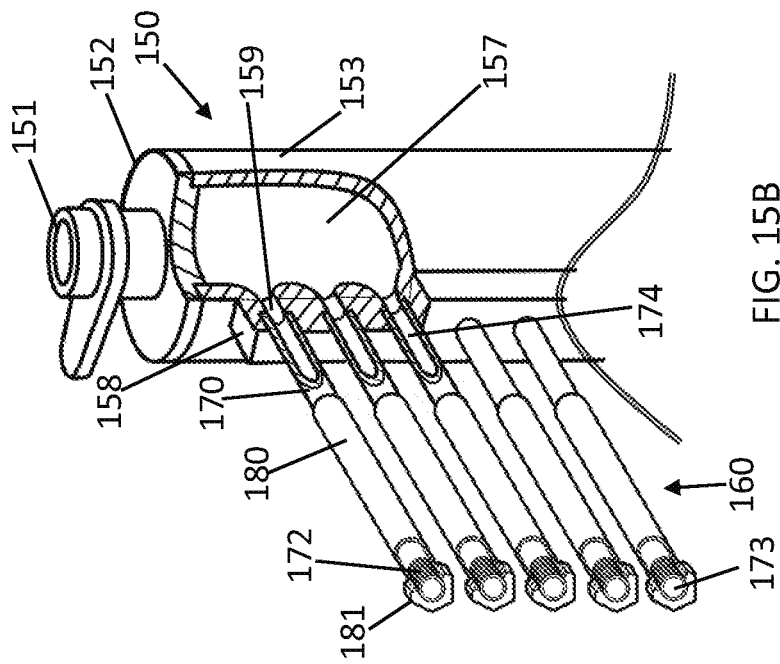
FIG. 15B is a partial perspective view of a resin plenum and dispensing tube assemblies with a portion of the body of the resin plenum removed to view the plenum chamber of the resin plenum, a portion of the outer dispensing tube removed to see the inner dispensing tube, and a portion of the inner dispensing tube removed to see the inner tube passage.
Figure 15A:
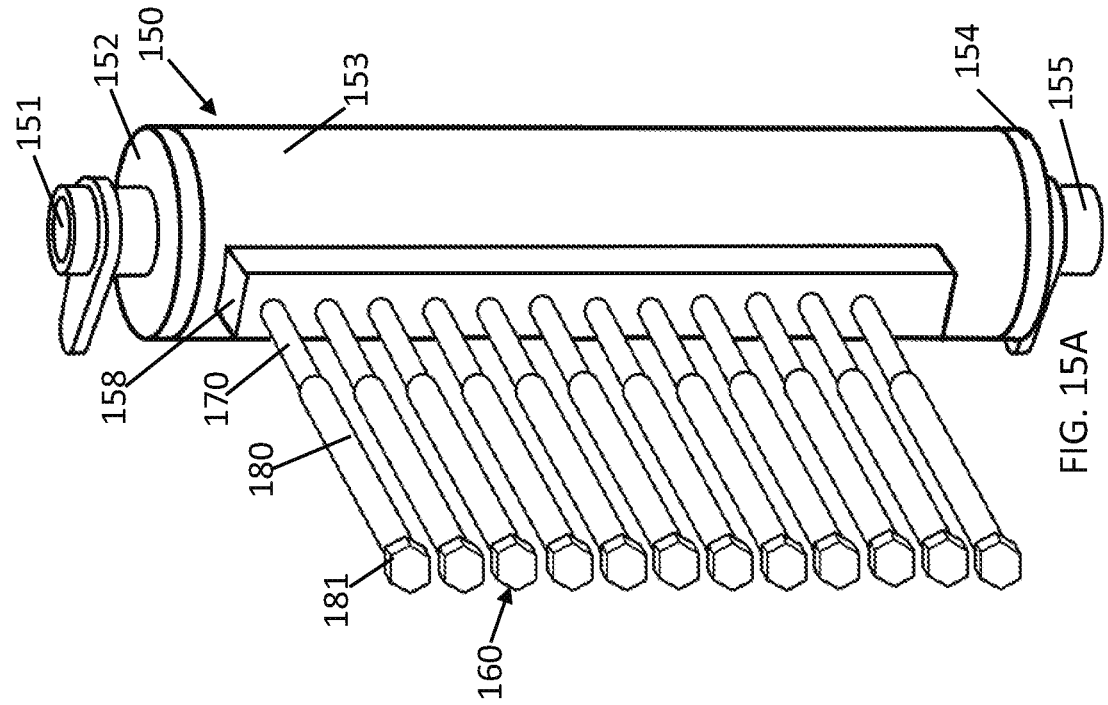
FIG. 15A is a perspective view of a resin plenum and dispensing tube assemblies.

One or more embodiments of a system and method of a continuous process for manufacturing composition friction units comprise a resin plenum 150. FIG. 15A depicts a perspective view of a non-limiting embodiment of a resin plenum 150 and FIG. 15B depicts a partial perspective view of a non-limiting embodiment of a resin plenum 150 with a portion of the body 153 removed to allow viewing of the plenum chamber 157 within the resin plenum 150. FIGS. 13 and 14 depict schematic views of two non-limiting systems of a continuous process for manufacturing composite friction units that utilize a resin plenum 150.

According to some aspects, a resin plenum 150 comprises a body 153 having a plenum chamber 157 housed therein. The resin plenum 150 may comprise a variety of shapes and configurations, such as but not limited to square/prism-shaped or cylindrical-shaped. In the non-limiting embodiment depicted in FIG. 15A, the body 153 is cylindrical in shape and comprises a substantially cylindrical plenum chamber 157 housed within the body 153. A cylindrical plenum chamber 157 is advantageous to normalize resin formulation pressure and flow during operation of the resin plenum 150.

One or more embodiments of a resin plenum further comprise at least one of an inlet valve 155 and an outlet valve 151. The inlet valve 155 may be operable to control flow or prevent flow of resin into the plenum chamber 157, and the outlet valve may be operable to control or prevent flow of resin out of the plenum chamber 157. According to some aspects, the inlet valve 155 is positioned proximate a bottom portion of the plenum chamber 150 below the plurality of dispensing tube assemblies 160 and the outlet valve 151 is positioned proximate a top portion of the plenum chamber 150 above the plurality of dispensing tube assemblies 160. Positioning of the inlet valve 155 proximate a bottom portion of the resin plenum 150 allows for more efficient filling of the plenum chamber 157 and dispensing tube assemblies 160 before resin is dispensed from the dispensing tube assemblies 160, thus improving uniformity and efficiency of resin dispensed from the dispensing tube assemblies 160. Furthermore, pumping resin into the resin plenum 150 from the bottom of the resin plenum charges the particles in the resin to keep the particles in suspension within the plenum chamber 157, thus preventing settling of large particles in the resin. In some embodiments, the resin plenum 150 comprises a removable top cap 152 and a removable bottom cap 154 positioned to allow a user to clean the plenum chamber 157 when the top cap 152 and/or bottom cap 154 are removed. In more particular embodiments, the inlet valve 155 is coupled to the bottom cap 154 and the outlet valve 151 is coupled the top cap 152. In other embodiments, however, the inlet valve 155 and the outlet valve 151 may be positioned elsewhere on the resin plenum 150.

According to some aspects, a resin plenum 150 is further configured to removably or fixedly couple to a plurality of dispensing tube assemblies 160. Accordingly, an embodiment of a resin plenum 150 comprises a plurality of plenum openings 159 positioned to transfer resin from the plenum chamber 157 to the plurality of dispensing tube assemblies 160. In one or more embodiments, the distance between the bottoms of each plenum opening is equal to the distance between the bottom of a cutout 142 and a top of an adjacent cutout 142 on a fabric array gate 140. In some, non-limiting embodiments, such as that depicted in FIG. 15B, the resin plenum 150 comprises a tube array block 158 positioned and configured to couple the plurality of dispensing tube assemblies to the resin plenum 150. In FIG. 15B, a portion of the tube array block 158 and the inner dispensing tube 170 have been removed to view the inner tube passage 174. The tube array block 158 may be welded or otherwise couple the body 153 of the resin plenum 150. More particularly, the plurality of plenum openings 159 may extend through the tube array block 158 such that each one of the plurality of dispensing tube assemblies 160 couples to the tube array block 158 and aligns with a different one of the plurality of plenum openings 159. When aligned, each plenum opening 159 allows fluid communication between the plenum chamber 157 and the inner tube passage 174 of the particular inner dispensing tube 170 coupled to the tube array block 158 at the plenum opening 159. The plurality of plenum openings 159 may comprise venturi-like shaping to improve resin flow into the dispensing tube assemblies 160, such as but not limited to machining upon an inner wall of the plenum chamber 157 at the intersection of the resin plenum 150 and the tube array block 158. In some embodiments, the tube array block 158 or the body 153 of the resin plenum comprises a plurality of female threaded couplings at least partially surrounding the plurality of plenum openings 159. Each female threaded coupling is configured to couple to a male threaded end 175 of an inner dispensing tube 170.

Various embodiments of a system and method of a continuous process for manufacturing composite friction units comprise one or more dispensing tube assemblies 160. The dispensing tube assemblies 160 are configured to dispense resin 195 to wet the reinforcing fiber fabrics 14. As shall be described in greater detail below, in some embodiments the dispensing tube assemblies are operable between a closed position that prevents dispensing of resin 195 and an open position that allows dispensing of resin 195. Such a configuration is advantageous to those previously known in the art because it allows resin 195 to fully fill each of the dispensing tube assemblies 160 before resin 195 is dispensed from the dispensing tube assemblies 160. This results in a more uniform and efficient distribution of resin 195 from each of the plurality of dispensing tube assemblies 160. Whereas conventional resin dispensers distribute resin at different rates during initiation of the system, thus creating excessive resin and material waste, the embodiments contemplated herein allow resin 195 to flow uniformly from the dispensing tube assemblies 160 upon initiation of the system.

According to some aspects, a dispensing tube assembly 160 comprises an inner dispensing tube 170 and an outer dispensing tube 180. In particular embodiments, the outer dispensing tube 180 is rotatably coupled to the inner dispensing tube 170. FIGS. 13-15 depict a non-limiting embodiment of dispensing tube assemblies 160 coupled to a resin plenum 150, and FIGS. 18A-C depict a non-limiting embodiment of a dispensing tube assembly 160 separated from the resin plenum 150. In some figures, portions of the inner dispensing tube 170 and/or the outer dispensing tube 180 have been removed to provide a better view of the dispensing tube assembly 180.

As previously noted, an inner dispensing tube 170 may be removably or fixedly coupled to a resin plenum 150. FIG. 16 depicts a non-limiting embodiment of an inner dispensing tube 170 with a portion of the outer wall removed to allow a view of the inner tube passage 174 and the plurality of dispensing bores 171. It is contemplated that the inner dispensing tube 170 may comprise a continuous cylinder having only the openings of the plurality of dispensing bores 171, the first end, and the second end prior to insertion of the cap 173. In one or more embodiments, an inner dispensing tube 170 comprises a first threaded end 175 configured to threadedly couple to the resin plenum 150. According to some aspects, an inner dispensing tube 170 is substantially cylindrical and comprises an inner tube passage 174 that is in fluid communication with the plenum chamber 157 when the inner dispensing tube 170 is coupled to the resin plenum 150. The inner dispensing tube 170 may further comprise a second threaded end 172 opposite the first threaded end 175 and configured to threaded coupled to an outer dispensing tube 180. FIGS. 15B and 18A-C depict a non-limiting embodiment of a dispensing tube assembly 160 with a portion of the outer dispensing tube 180 removed to view the second threaded end 172 coupled to the outer dispensing tube. According to some aspects, an inner dispensing tube 170 further comprises an end plug 173 opposite threaded end 175 and configured to prevent the flow of resin or other fluid communication from the second threaded end 172. The end plug 173 may be removably coupled, fixedly coupled, or integral with the second threaded end 172.

The inner dispensing tube further comprises a plurality of dispensing bores 171. The plurality of dispensing bores 171 extending through the wall of the inner dispensing tube 170 to allow fluid communication between the plenum chamber 157 and the dispensing bores 171 via the inner tube passage 174. The dispensing bores 171 are configured and sized to dispense resin 195 from the plenum chamber 157 to a reinforced fiber fabric 14. The plurality of dispensing bores 171 may be aligned in a single line along the length of the inner dispensing tube. In one non-limiting example, the plurality of dispensing bores 171 each comprise a diameter of approximately 0.25 inches and are spaced approximately 0.75 inches from one another (as measured from center points of the dispensing bores 171). The dispensing bores 171 may be spread across a length of the inner dispensing tube 170 that is between approximately 3.5 inches and approximately 4.5 inches. Other embodiments comprise dispensing bores 171 of other sizes and spaces.

Each dispensing tube assembly 160 may further comprise an outer dispensing tube rotatably coupled to an inner dispensing tube 170. In various embodiments, the outer dispensing tube 180 comprises an outer tube passage 184 sized such that a portion of an inner surface 186 of the outer dispensing tube 180 interfaces with an outer surface 186 of the inner dispensing tube 170 when the two are coupled together. The outer dispensing tube 180 is sized in length at least a dimension to cover the plurality of dispensing bores 171 when the outer dispensing tube is 180 is coupled to the inner dispensing tube 170 and in a closed position (shown in FIG. 18A). The outer dispensing tube 180 may comprise an open end 189 that is positioned proximate the resin plenum 150 when in use, and a threaded end 183 opposite the open end 189. A threaded end 183 opposite the open end 189, according to some aspects, is configured to threadedly couple to a second threaded end 172 of an inner dispensing tube 170. One or more embodiments further comprise a flow control fitting 181 on the outer dispensing tube 180. In the non-limiting embodiment depicted in FIG. 18B, the flow control fitting 181 comprises a hex head flow control fitting positioned proximate the threaded end 183. The flow control fitting 181 may comprise any fitting configured to allow a user to manually rotate the outer dispensing tube 180 between open and closed positions. In some embodiments, the aforementioned manual control may be replaced by automated control means. In some embodiments, a dispensing tube assembly 160 comprises one or more sealing rings on the inner dispensing tube 170 and configured to form a seal between the inner surface 186 of the outer dispensing tube 180 and the outer surface 176 of the inner dispensing tube 170. The one or more sealing rings may comprise any seal known in the art, such as but not limited to a Derlin ring seal. According to some aspects, one or more sealing rings are positioned around the inner dispensing tube 170 proximate each end of the outer dispensing tube 180.

An outer dispensing tube 180 may further comprise at least one flow control slot 182 that extends through the wall of the outer dispensing tube 180. The flow control slot 182 is sized to expose all of the plurality of dispensing bores 171 when the outer dispensing tube is in an open position (shown in FIGS. 18B and 18C). In other embodiments, the outer dispensing tube 180 may comprise multiple flow control slots 182 of varying lengths in order to allow or restrict flow from varying numbers of the plurality of dispensing bores 171.

As previously referenced in this document, various contemplated embodiments comprise dispensing tube assemblies operable between a closed position and an open position. FIGS. 18A-C depict a non-limiting embodiment of a dispensing tube assembly 160 at various stages of operation. In FIG. 18A, an outer dispensing tube 180 is in a closed position wherein the outer dispensing tube 180 covers each of the plurality of dispensing bores 171 to prevent dispensing of resin from the dispensing tube assembly 160. In such a position, a flow control slot 182 is not aligned with the plurality of dispensing bores 171. In FIG. 18B, an outer dispensing tube 180 has been rotated to an open position wherein the flow control slot 182 is aligned with the plurality of dispensing bores 171. In this open position, the flow control slot 182 is in fluid communication with the plenum chamber 157 via the dispensing bores 171 and inner tube passage 174. In this open position, then, resin 195 may be dispensed through the dispensing bores 171 and flow control slot 182 to wet a reinforced fiber fabric 14. FIG. 18C depicts a non-limiting embodiment of a dispensing tube assembly 160 in the open position and dispensing resin 195 through the plurality of dispensing bores 171 and a flow control slot 182 to wet a reinforcing fiber fabric 14. Although only a single fabric 14 and dispensing tube assembly 160 is shown in FIG. 18C, it is contemplated that wetting may take place in similar manner to a plurality of fabrics 14 with a plurality of dispensing tube assemblies 160 (such as those shown in FIGS. 13 and 14). It is further contemplated that the outer dispensing tube 180 may be rotated to one or more intermediate positions between the open and closed positions that partially cover or uncover the plurality of dispensing bores 171.

In operation, resin may be pumped into the resin plenum 150 through a inlet valve 155 proximate a bottom portion of the resin plenum with the outlet valve 151 closed or in a venting position and the dispensing tube assemblies 160 in closed or in venting positions. In such circumstances, the resin fills the plenum chamber 157 and the inner tube passages 174 of the dispensing tube assemblies 160 while preventing exhaustion of free resin from either resin plenum 150 or the dispensing tube assemblies 160. Upon filling of the plenum chamber 157 and the inner tube passages 174, the outer dispensing tubes 180 may each be rotated to an open position to dispense resin 195 from the dispensing tube assemblies 160. Because the plenum chamber 157 and the inner tube passages 174 have filled prior to dispensing of any resin 195, wetting of the reinforcing fiber fabric 14 occurs at a substantially uniform rate upon rotation of the outer dispensing tube 180 to the open position. Rotation of the plurality of dispensing tube assemblies 160 may be by manual rotation or by automatic electronic rotation.

Figure 20:
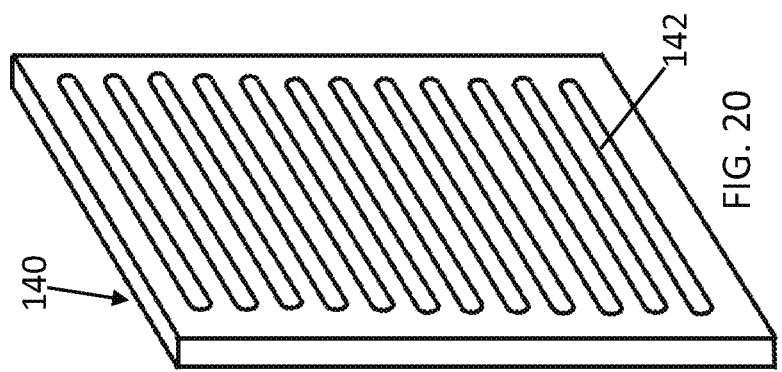
FIG. 20 is a perspective view of a fabric array gate.

One or more embodiments of a system and method of a continuous process for manufacturing composite friction units comprise one or more fabric array gates 140. FIG. 20 depicts a perspective view of a non-limiting embodiment of a fabric array gate 140, and FIGS. 13 and 14 depict two non-limiting systems of a continuous process for manufacturing composite friction units that utilize a fabric array gate 140. The fabric array gate 140 may be fixed or removeably held in place within a system that may include a frame or cabinet-like enclosure.

According to some aspects, a fabric array gate 140 comprises a plurality of cutouts 142. More particularly a fabric array gate 140 may comprise a plurality of cutouts 142 equal in number to the plurality of dispensing tube assemblies 160. Although referenced as a cutout 142 herein, it is contemplated that the cutout may comprise any opening, channel, passage, tube arrangement or the like extending through the fabric array gate and configured to allow passage of reinforcing fiber fabric 14 through each of the plurality of cutouts 142. In particular embodiments, the plurality of cutouts are radiused and sized larger that the reinforcing fiber fabric that passes through the cutout 142. Spacing of the plurality of cutouts 142 on the fabric array gate 140 may vary according to different embodiments. In one or more embodiments, the distance between each cutout is greater than the outer diameter of the outer dispensing tube 180, more particularly in some embodiments, greater than the outer diameter of the flow control fitting 181 of the outer dispensing tube 180.

Positioning of the one or more fabric array gates 140 may vary according to the particular system and method. For example, in the non-limiting embodiment depicted in FIG. 13, the system comprises at least two fabric array gates 140. In such an embodiment, a first fabric array gate 140 may be positioned before the resin plenum 150 and the dispensing tube assemblies 160, and a second fabric array gate 140 may be positioned after the resin plenum 150 and dispensing tube assemblies 160. More particularly, the first fabric array gate 140 may be positioned directly before the resin plenum 150 and the dispensing tube assemblies 160, and the second fabric array gate 140 may be positioned directly after the resin plenum 150 and dispensing tube assemblies 160.

In one or more embodiments, the first fabric array gate 140 is positioned such that each of the plurality of cutouts 142 receive a different one of the plurality of reinforcing fiber fabrics 14 according to other aspects described elsewhere in this document. The first fabric array gate 140 is further positioned such that each cutout 142 of the plurality of cutouts 142 substantially aligns with a different one of the plurality of dispensing tube assemblies 160 and allows for a reinforcing fiber fabric 14 to pass through the cutout 142 and interface with or be positioned proximate a dispensing tube assembly 160 in order to receive the resin. The second fabric array gate 140 may be similarly positioned after the dispensing tub assemblies 160. That is, the plurality of cutouts 142 of the second fabric array gate 140 may be aligned with the plurality of dispensing tube assemblies 160 in order to receive the plurality of reinforcing fiber fabrics 14 after the dispensing tube assemblies 160 have dispensed resin onto the reinforcing fiber fabrics 14.

In the non-limiting embodiment depicted in FIG. 14, the system utilizes only a single fabric array gate 140 positioned before the resin plenum 150 and dispensing tube assemblies 160 and a heater array 190 positioned after the resin plenum 150 and dispensing tube assemblies 160 rather than the second fabric array gate 140 shown in the embodiment depicted in FIG. 13. The heater array 190 may comprise any preheating device known in the art. In the non-limiting embodiment depicted in FIG. 14, a heater array 190 comprises a plurality of electric tube heaters 192. More particularly, a heater array 190 may comprise a plurality of electric tube heaters 192 equal in number to the plurality of dispensing tube assemblies 160 and cutouts 142 of the fabric array gate 140. Other preheating devices known in the art may be utilized in other embodiments, such as but not limited to recirculating hot water. According to some aspects, the electric tube heaters 192 (or other heaters) are positioned on the heater array such that the electric tube heaters 192 contact the bottom, dry surface of the reinforcing fiber fabric 14 after wetting.

Figure 22:
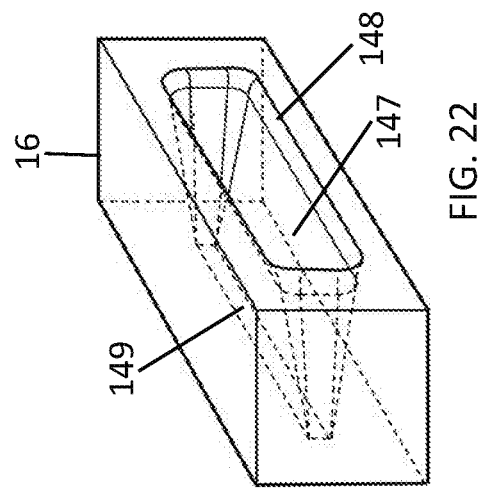
FIG. 22 is a perspective view of a pre-form, with broken lines depicting aspects of the pre-form not visible from the perspective view.
Figure 21:
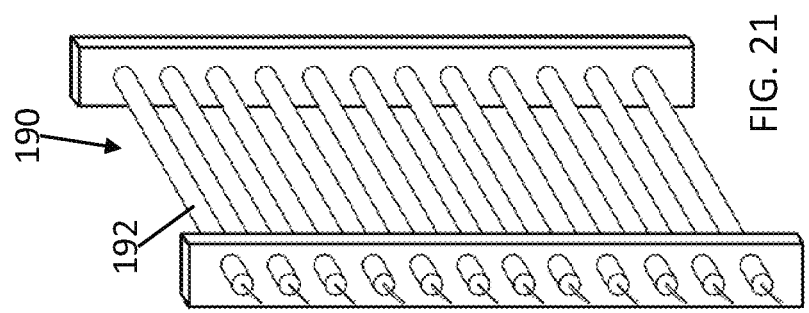
FIG. 21 is a perspective view of a heater array.

Upon wetting of the reinforcing fiber fabric 14 by the dispensing tube assemblies 160, the wetted plurality of reinforcing fiber fabrics 14 may be pulled through a pre-form 16. The wetted plurality of reinforcing fiber fabrics 14 may pass through a heater array 190 or fabric array gate 140 after wetting but before being pulled through the pre-form 16. The pre-form may comprise any pre-form known in the art or described elsewhere in this document. FIG. 22 depicts a non-limiting embodiment of a pre-form 16, and FIGS. 13 and 14 depict non-limiting embodiments of systems utilizing a pre-form 16. According to some aspects, a pre-form 16 comprises a loading opening 148 facing the dispensing tube assemblies 160, an exit opening 149 facing the forming die 18 and having a smaller area than the loading opening 148, and a passage 147 that narrows or tapers from the loading opening 148 to the exit opening 149. In one or more embodiments, the exit opening 149 comprises an area substantially equal to the entrance opening 156 of the forming die 18. The tapering of the passage 147 between the loading opening 148 and the exit opening 149 further compacts the wetted plurality of reinforcing fiber fabrics 14 and strains back excess resin from the wetting process.

As referenced elsewhere in this document, one or more embodiments of a system and method of a continuous process for manufacturing composite friction units comprise a forming die 18. The forming die 18 is positioned after the dispensing tube assemblies 160 such that the forming die receives the wetted plurality of reinforcing fiber fabrics 14. In more particular embodiments, the forming die is positioned after the pre-form 16. FIG. 19 depicts a non-limiting embodiment of a forming die 18. According to aspects, a forming die 18 comprises an entrance opening 156 positioned to receive the wetted plurality of reinforcing fiber fabrics 16 and an exit opening 155. The forming die 18 may further comprise a cavity therein, such as but not limited to a polished or chromed cavity. According to some aspects, the forming die comprises a plurality of heaters on the top and bottom surface of the forming die 18 to produce one or more heat zones for composite curing of the wetted plurality of reinforcing fiber fabrics.

In operation, a continuous process for manufacturing composite friction units comprises pulling a plurality of reinforcing fiber fabrics 14 through a plurality of cutouts 142 of a first fabric array gate 140, with each one of the plurality of reinforcing fiber fabrics 14 being pulled through a different one of the plurality of cutouts 142 on the fabrics array gate 140. A process further comprises pulling the wetted plurality of reinforcing fiber fabrics 14 through a composite forming die 18 for forming a body.

A continuous process for manufacturing composite friction units of claim 10, may comprise pumping resin material 195 into a resin plenum 150 comprising a resin chamber 157 in fluid communication with the plurality of dispensing tube assemblies 160. More particularly, the resin material 195 may be pumped into the resin plenum 150 from an inlet valve 155 proximate a bottom end of the resin plenum 150 with each outer dispensing tube 180 of a plurality of dispensing tube assemblies 160 in the closed position until the resin material 195 has filled the resin chamber 157 and each inner tube passage 174.

A process may further comprise wetting the plurality of reinforcing fiber fabrics 14 with a resin material 195 dispensed from a plurality of dispensing tube assemblies 160, each one of the plurality of reinforcing fiber fabrics 14 being wetted with a different one of the plurality of dispensing tube assemblies 160. More particularly, each of the plurality of dispensing assemblies 160 may comprise an inner dispensing tube 170 comprising an inner tube passage 174 in fluid communication with the plenum chamber 157 and a plurality of dispensing bores 171, and an outer dispensing tube 180 rotatably coupled to the inner tube 170 and comprising an inner surface 186 that surrounds outer tube passage 184 and interfaces with at least a portion of an outer surface 175 of the inner dispensing tube 170, and a flow control slot 182. A process may further comprise rotating each outer dispensing tube 180 to an open position wherein the flow control slot 182 is aligned with the plurality of dispensing bores 171 of the inner dispensing tube 170 such that the resin 195 from the resin plenum 150 is dispensed through the plurality of dispensing bores 171 and the flow control slot 182 to wet the reinforcing fiber fabric 14. A process may further comprise rotating each outer dispensing tube 180 to a closed position wherein the flow control slot 182 is not aligned with the plurality of dispensing bores 171 of the inner dispensing tube 170 such that the resin 195 from the resin plenum 150 is prevented from being dispensed through the plurality of dispensing bores 171 by the outer dispensing tube 180.

A process may further comprise pulling a wetted plurality of reinforcing fiber fabrics 14 through a plurality of cutouts 142 of a second fabric array gate 140, each one of the wetted plurality of reinforcing fiber fabrics 14 being pulled through a different one of the plurality of cutouts 142 of the second fabrics array gate 140. A process may further comprise pulling the wetted plurality of reinforcing fiber fabrics 14 through a narrowing channel 147 of a pre-form 16 after the wetted plurality of reinforcing fiber fabrics 14 have been pulled through the second fabric array gate 14 and before the wetted plurality of reinforcing fiber fabrics 14 have been pulled through the composite forming die 18.

In alternate embodiments, a process may comprise heating the wetted plurality of reinforcing fiber fabrics 14 by pulling the wetted plurality of reinforcing fiber fabrics 14 through a heater array 190 comprising a plurality of electric tube heaters 192, each one of the wetted plurality of reinforcing fiber fabrics 14 interfacing with a different one of the plurality of electric tube heaters 192. A process may further comprise pulling the heated and wetted plurality of reinforcing fiber fabrics 14 through a narrowing channel 147 of a pre-form 16 after the heated and wetted plurality of reinforcing fiber fabrics 14 have been pulled through the heater array 190 and before the heated and wetted plurality of reinforcing fiber fabrics 14 have been pulled through the composite forming die 18.

While I have illustrated and described my invention by means of specific embodiments, it is to be understood that numerous changes and modifications may be made therein without departing from the spirit and the scope of the invention as shown in the appended claims.

The invention claimed is:

1. A continuous process for manufacturing composite friction units, comprising:
    pulling a plurality of panels of reinforcing fiber fabric through a plurality of cutouts of a first fabric array gate, each one of the plurality of panels of reinforcing fiber fabric being pulled through a different one of the plurality of cutouts on the first fabric array gate;
    pulling the plurality of panels of reinforcing fiber fabric through a resin dispensing system comprising a plurality of dispensing tubes each associated with a different panel of the plurality of panels;
    wetting each one of the plurality of panels of reinforcing fiber fabric with a resin material dispensed from the plurality of dispensing tubes of the resin dispensing system;
    pulling the wetted plurality of panels of reinforcing fiber fabric through a composite forming die to form a composite panel from the plurality of panels of reinforcing fabric; and
    cutting a desired shape part from the composite panel with a cutting mechanism.

2. The continuous process for manufacturing composite friction units of claim 1, wherein wetting each one of the plurality of panels of reinforcing fiber fabric with the resin material comprises wetting each one of the plurality of panels of reinforcing fiber fabric with the resin material dispensed from a plurality of dispensing tube assemblies, each one of the plurality of panels of reinforcing fiber fabric being wetted with a different one of the plurality of dispensing tube assemblies.

3. The continuous process for manufacturing composite friction units of claim 1, further comprising pumping the resin material into a resin plenum comprising a resin chamber in fluid communication with a plurality of dispensing tube assemblies.

4. The continuous process for manufacturing composite friction units of claim 3, wherein each of the plurality of dispensing assemblies comprises an inner dispensing tube comprising an inner tube passage in fluid communication with a plenum chamber and a plurality of dispensing bores, and an outer dispensing tube rotatably coupled to the inner dispensing tube and comprising an outer tube passage that interfaces with at least a portion of the inner dispensing tube and a flow control slot, wherein the process further comprises:

rotating each outer dispensing tube to an open position wherein the flow control slot is aligned with the plurality of dispensing bores of the inner dispensing tube such that the resin material from the resin plenum is dispensed through the plurality of dispensing bores and the flow control slot to wet the plurality of panels of reinforcing fiber fabric; and rotating each outer dispensing tube to a closed position wherein the flow control slot is not aligned with the plurality of dispensing bores of the inner dispensing tube such that the resin material from the resin plenum is prevented from being dispensed through the plurality of dispensing bores by the outer dispensing tube.

5. The continuous process for manufacturing composite friction units of claim 4, wherein pumping the resin material into the resin plenum comprises pumping the resin material into the resin plenum from an inlet valve proximate a bottom end of the resin plenum with each outer dispensing tube of a plurality of dispensing tube assemblies in the closed position until the resin material has filled the resin chamber and each inner tube passage.

6. The continuous process for manufacturing composition friction units of claim 5, further comprising:

pulling the wetted plurality of panels of reinforcing fiber fabric through a plurality of cutouts of a second fabric array gate, each one of the wetted plurality of panels of reinforcing fiber fabric being pulled through a different one of the plurality of cutouts of the second fabric array gate; and pulling the wetted plurality of panels of reinforcing fiber fabric through a narrowing channel of a pre-form after the wetted plurality of panels of reinforcing fiber fabric have been pulled through the second fabric array gate and before the wetted plurality of panels of reinforcing fiber fabric have been pulled through the composite forming die.

7. The continuous process for manufacturing composition friction units of claim 5, further comprising:

heating the wetted plurality of panels of reinforcing fiber fabric by pulling the wetted plurality of panels of reinforcing fiber fabric through a heater array comprising a plurality of electric tube heaters, each one of the wetted plurality of panels of reinforcing fiber fabric interfacing with a different one of the plurality of electric tube heaters; and pulling the heated and wetted plurality of panels of reinforcing fiber fabric through a narrowing channel of a pre-form after the heated and wetted plurality of panels of reinforcing fiber fabric have been pulled through the heater array and before the heated and wetted plurality of panels of reinforcing fiber fabric have been pulled through the composite forming die.

8. A continuous process for manufacturing composite friction units, comprising:

pulling a plurality of panels of reinforcing fiber fabric through a resin dispensing system comprising a plurality of dispensing tubes each associated with a different panel of the plurality of panels;

pulling the plurality of panels of reinforcing fiber fabric through a plurality of cutouts of a first fabric array gate, each one of the plurality of panels of reinforcing fiber fabric being pulled through a different one of the plurality of cutouts on the first fabric array gate;

wetting each one of the plurality of panels of reinforcing fiber fabric with a resin material dispensed from a plurality of dispensing tube assemblies, each one of the plurality of panels of reinforcing fiber fabric being wetted with a different one of the plurality of dispensing, tube assemblies; and pulling the wetted plurality of panels of reinforcing fiber fabric through a composite forming die to form a composite panel from the plurality of panels of reinforcing fabric.

9. The continuous process for manufacturing composite friction units of claim 8, further comprising pumping the resin material into a resin plenum comprising a resin chamber in fluid communication with the plurality of dispensing tube assemblies.

10. The continuous process for manufacturing composite friction units of claim 9, wherein each of the plurality of dispensing assemblies comprises an inner dispensing tube comprising an inner tube passage in fluid communication with a plenum chamber and a plurality of dispensing bores, and an outer dispensing tube rotatably coupled to the inner dispensing tube and comprising an outer tube passage that interfaces with at least a portion of the inner dispensing tube and a flow control slot, wherein the process further comprises:

rotating each outer dispensing tube to an open position wherein the flow control slot is aligned with the plurality of dispensing bores of the inner dispensing tube such that the resin material from the resin plenum is dispensed through the plurality of dispensing bores and the flow control slot to wet the plurality of panels of reinforcing fiber fabric; and rotating each outer dispensing tube to a closed position wherein the flow control slot is not aligned with the plurality of dispensing bores of the inner dispensing tube such that the resin material from the resin plenum is prevented from being dispensed through the plurality of dispensing bores by the outer dispensing tube.

11. The continuous process for manufacturing composite friction units of claim 10, wherein pumping the resin material into the resin plenum comprises pumping the resin material into the resin plenum from an inlet valve proximate a bottom end of the resin plenum with each outer dispensing tube of the plurality of dispensing tube assemblies in the closed position until the resin material has filled the resin chamber and each inner tube passage.

12. The continuous process for manufacturing composition friction units of claim 11, further comprising:

pulling the wetted plurality of panels of reinforcing fiber fabric through a plurality of cutouts of a second fabric array gate, each one of the wetted plurality of panels of reinforcing fiber fabric being pulled through a different one of the plurality of cutouts of the second fabric array gate; and pulling the wetted plurality of panels of reinforcing fiber fabric through a narrowing channel of a pre-form after the wetted plurality of panels of reinforcing fiber fabric have been pulled through the second fabric array gate and before the wetted plurality of panels of reinforcing fiber fabric have been pulled through the composite forming die.

13. The continuous process for manufacturing composition friction units of claim 11, further comprising:

heating the wetted plurality of panels of reinforcing fiber fabric by pulling the wetted plurality of panels of reinforcing fiber fabric through a heater array comprising a plurality of electric tube heaters, each one of the wetted plurality of panels of reinforcing fiber fabric interfacing with a different one of the plurality of electric tube heaters; and pulling the heated and wetted plurality of panels of reinforcing fiber fabric through a narrowing channel of a pre-form after the heated and wetted plurality of panels of reinforcing fiber fabric have been pulled through the heater array and before the heated and wetted plurality of panels of reinforcing fiber fabric have been pulled through the composite forming die.

* * * * *